US006558260B1

(12) United States Patent
Jackel et al.

(10) Patent No.: US 6,558,260 B1
(45) Date of Patent: *May 6, 2003

(54) TORSIONAL VIBRATION DAMPING APPARATUS

(75) Inventors: Johann Jackel, Bühl (DE); Wolfgang Reik, Bühl (DE)

(73) Assignee: uK Lamellen und Kupplungsbau Beteiligungs KG, Buhl (DE)

(*) Notice: Subject to any disclaimer, the term of this patent is extended or adjusted under 35 U.S.C. 154(b) by 0 days.

This patent is subject to a terminal disclaimer.

(21) Appl. No.: 07/963,109

(22) Filed: Oct. 19, 1992

Related U.S. Application Data

(62) Division of application No. 07/617,918, filed on Nov. 21, 1990, which is a continuation of application No. 07/069,708, filed on Jul. 2, 1987, now abandoned.

(30) Foreign Application Priority Data

Oct. 4, 1986 (DE) ............................. 36 33 828
Dec. 13, 1986 (DE) ............................. 36 42 716

(51) Int. Cl.⁷ .............................................. F16D 31/00
(52) U.S. Cl. ............................. 464/24; 464/27; 464/68
(58) Field of Search .......................... 464/24, 27, 64, 464/66, 67, 68; 192/106.2; 74/574

(56) References Cited

U.S. PATENT DOCUMENTS

| 2,071,885 A | * | 2/1937 | Lewis et al. ............... 464/67 |
| 4,351,167 A | * | 9/1982 | Hanke et al. ............... 464/24 |
| 4,484,898 A | * | 11/1984 | Kohno ........................ 464/64 |
| 4,530,673 A | * | 7/1985 | Lamaeche ................. 464/68 X |
| 4,611,701 A | * | 9/1986 | Friedmann ............... 192/110 B |
| 4,663,983 A | * | 5/1987 | Kobayashi et al. ....... 464/68 X |
| 4,674,991 A | * | 6/1987 | Tojima et al. ................ 464/24 |
| 4,684,007 A | * | 8/1987 | Maucher ................... 464/68 X |
| 4,782,718 A | * | 11/1988 | Harig et al. ........ 192/106.2 X |
| 5,194,044 A | * | 3/1993 | Jackel et al. .............. 464/68 X |
| 5,242,328 A | * | 9/1993 | Friedmann et al. ........... 464/67 |
| 5,273,372 A | * | 12/1993 | Friedmann et al. ........... 464/24 |

OTHER PUBLICATIONS

"The Two–Mass Flywheel—A Torsional Vibration Damper for the Power Train of Passenger Cars—State of the Art and Further Technical Development", Sebulke, SAE Technical Paper Series No. 870394, Feb. 1987.*

* cited by examiner

Primary Examiner—Lynne H. Browne
Assistant Examiner—Eileen A Dunn
(74) Attorney, Agent, or Firm—Darby & Darby

(57) ABSTRACT

A torsional vibration damping apparatus which operates between the crankshaft of the engine and the input shaft of the transmission in a motor vehicle has two flywheels which are rotatable relative to each other against the opposition of one or more dampers installed in a fluid-containing chamber of the flywheel which is connected to the crankshaft. The chamber has one or two annular compartments for the coil springs of the damper or dampers, and such coil springs are caused to store energy by a flange which is connected to the flywheel that drives the input shaft of the transmission and by integral or separately produced stops-of the flywheel which is connected with the crankshaft. The flange cooperates with the respective flywheel to form a flow restrictor which opposes the flow of fluid from and into the compartment or compartments of the chamber in response to expansion or contraction of the coil springs.

55 Claims, 8 Drawing Sheets

TORSIONAL VIBRATION DAMPING APPARATUS

CROSS-REFERENCE TO RELATED CASES

This application is a division, of application Ser. No. 07/617,918, filed Nov. 21,1990 which is a continuation of application Ser. No. 07/069,708, filin date Jul. 2, 1987, now abandoned.

The apparatus of the present invention is similar to those which are described in commonly owned copending patent application Ser. No. 07/617,918 filed Jul. 2, 1987 by Johann Jackel et al. for "Apparatus for damping vibrations". Numerous apparatus embodying certain features of the apparatus of the present invention are disclosed in additional pending United States patent applications and in numerous United States and foreign Letters Patent of the assignee of the present application.

BACKGROUND OF THE INVENTION

The invention relates to improvements in apparatus for damping vibrations, especially between the output element of an engine (such as the internal combustion engine of a motor vehicle) and a power train (particularly the power train including the change-speed transmission in a motor vehicle). More particularly, the invention relates to improvements in torsional vibration damping apparatus of the type wherein at least two flywheels are rotatable relative to each other against the opposition of damper means, wherein one of the flywheels is connectable to the output element of the engine, and wherein another flywheel is connectable with the input element of a change-speed transmission, especially by way of a clutch (such as a friction clutch).

Vibration damping apparatus of the above outlined character normally employ one or more dampers which comprise elastic energy storing elements (such as circumferentially extending coil springs) installed or operating between the flywheels in such a way that they oppose rotation of the flywheels relative to each other and undergo compression and store energy when one of the flywheels is caused to change its angular position with reference to the other flywheel, and/or energy storing elements which act in the axial direction and employ or cooperate with friction pads or linings to generate friction (i.e., hysteresis). As a rule, or in many instances, the energy storing elements which act in the axial direction of the flywheels are connected in parallel with the damper or dampers acting in the circumferential direction of the flywheels.

It has been found that, though the just described conventional vibration damping apparatus are quite satisfactory under certain operating conditions (i.e., they can damp certain types of vibrations and they can also reduce noise which develops in response to angular movements of the flywheels relative to each other), the operation of all presently known apparatus constitutes a compromise between an optimum operation under first circumstances and a less satisfactory operation under different second circumstances. For example, purely mechanical vibration damping apparatus cannot satisfactorily oppose a full spectrum of vibrations which are likely to develop at different rotational speeds of the engine and/or under different loads and/or on different types of terrain and/or in different types of motor vehicles. The same applies for the reduction of noise under such widely different circumstances. The bulk and cost of mechanical vibration damping apparatus increase considerably if such apparatus are to be designed with a view to satisfactorily oppose vibrations and to reduce noise under two or more different circumstances which require different modes of vibration damping and/or different modes of noise reduction. Another drawback of purely mechanical vibration damping apparatus is that they cannot conform their damping characteristics to a variety of widely different operating conditions which vary within wide ranges (for example, to different operating conditions which arise as a result of acceleration of the engine-driven flywheel from a relatively low speed to a much higher speed or vice versa). One of the reasons for such lack of versatility of mechanical vibration damping apparatus is that the histeresis of their energy storing elements which act in the circumferential direction of the flywheels cannot adequately conform to changing operating conditions. Moreover, mechanical vibration damping apparatus are prone to malfunction and their parts are subject to extensive wear.

Another drawback of presently known vibration damping apparatus is that they do not allow for extensive angular movements of the flywheels relative to each other. In other words, the damping action of the damper or dampers must be very pronounced, at least during the major part of the extent of angular displacement of the flywheels relative to each other. This prevents the conventional apparatus from effectively damping large-amplitude vibrations.

OBJECTS AND SUMMARY OF THE INVENTION

An object of the invention is to provide a novel and improved vibration damping apparatus which can be used as a superior substitute for heretofore known apparatus between the engines and the power trains of motor vehicles.

Another object of the invention is to provide an apparatus which can effectively filter vibrations between the engine and the change-speed transmission of a motor vehicle under a wide range of operating conditions.

A further object of the invention is to provide an apparatus which is effective at low, medium and high rotational speeds of its flywheels as well as at resonance RPM and during starting and stoppage of the engine.

An additional object of the invention is to provide an apparatus whose damping characteristics (i.e., its ability to dissipate energy) can readily conform to different vibration generating and/or noise generating parameters of the vehicle.

Still another object of the invention is to provide a relatively simple, compact and inexpensive apparatus which can oppose vibratory movements and the generation of noise in a number of different ways (including hydraulically and mechanically) and at least as effectively as specially designed inflexible (low-versatility) conventional vibration damping apparatus.

A further object of the invention is to provide an apparatus whose parts can be mass-produced in available machines and with a minimum of material removing treatment.

Another object of the invention is to provide an apparatus whose useful life is long and wherein the parts are subject to less wear than in conventional apparatus.

An additional object of the invention is to provide the apparatus with novel and improved flywheels.

Another object of the invention is to provide a novel and improved method of assembling the above outlined apparatus and a novel and improved method of coordinating the action of two or more hydraulic and/or mechanical dampers.

A further object of the invention is to provide the apparatus with novel and improved damper means and to provide the apparatus with novel and improved means for confining and shielding the damper means.

Another object of the invention is to provide a motor vehicle which embodies the above outlined apparatus and to provide a novel and improved torque-transmitting connection between the engine and the change-speed transmission of a motor vehicle.

An additional object of the invention is to provide a novel and improved torque-transmitting connection between the relatively movable parts of the above outlined apparatus.

The invention is embodied in an apparatus which can be used to damp vibrations, particularly torsional vibrations between an engine (such as the internal combustion engine of a motor vehicle) and a power train (particularly a power train including a change-speed transmission and a friction clutch which can establish a torque-transmitting connection between the input element of the transmission and the output element of the engine), wherein a first flywheel is connectable with the engine, wherein a second flywheel is rotatable relative to the first flywheel and is connectable with the power train (particularly by way of a clutch, such as the aforementioned friction clutch), and wherein a damper means operates between and yieldably opposes rotation of the first and second flywheels relative to each other. More particularly, the invention resides in improvements in the above outlined apparatus, the improvements including at least three of the following features:

(a) One of the flywheels includes sections which define an annular compartment for a supply of viscous fluid medium (preferably a lubricant of pasty consistency) which at least partially fills the compartment, the compartment has an at least substantially closed cross-sectional outline and the damper means comprises at least two energy storing elements (such as springs, especially coil springs) which are disposed in the annular compartment at the same distance from the axis of the one flywheel and are directly or indirectly engageable or engaged by the sections of the one flywheel;

(b) a flange (e.g., a flat metallic disc) extends radially into the compartment and engages the energy storing elements and at least substantially seals the compartment, and means (such as a coupling including a portion of the flange) is provided to transmit torque between the flange and the other of the first and second flywheels;

(c) the flywheels are rotatable relative to each other against the opposition of the energy storing elements through angles of at least 25 degrees in clockwise and counterclockwise directions starting from a neutral position which may but need not always be the same;

(d) the total number of energy storing elements is less than five and such elements jointly extend along an arc which approximates between 70 and 96% of a complete circle;

(e) the energy storing elements jointly extend along an arc of 70–96% of the circumference of the one flywheel; and (f) the energy storing elements are prefabricated or pre-curved to exhibit a curvature with a radius of curvature which equals or approximates the radius of the annular compartment (this simplifies the assembly of the damper means with the sections of the one flywheel).

The flange is preferably provided with substantially radial outwardly extending arms which project into the compartment and engage the energy storing elements. The flange can be further provided with one or more ribs which extend in the circumferential direction of the one flywheel and merge into the arms. The sections preferably further define an annular passage which communicates with the annular compartment and receives the ribs of the flange.

The sections of the one flywheel preferably include two substantially shell-shaped sections at least one of which can consist of sheet metal. Alternatively, at least one of the sections can constitute a metallic casting.

The sections are provided with integral or separately produced inserts which constitute abutments for the energy storing elements and extend into the compartment. The latter preferably extends along an arc of 360°, i.e., it can constitute a circumferentially complete annular compartment. The abutments can include or constitute rivets which are secured to the sections of the one flywheel, and such abutments are or can be disposed at opposite sides of the arms of the flange in the neutral positions of the flywheels. The inserts can constitute integral pocket-like portions of the sections of the one flywheel.

The abutments flank the arms of the flange and at least one arm of the flange can be shorter or longer than the adjacent abutments (as seen in the circumferential direction of the one flywheel). Each energy storing element of the damper means is located between an arm of the flange and a pair of abutments, and the damper means can further comprise retainer means (e.g., cup-shaped spring retainers) between at least one of the arms and the respective energy storing element. The arrangement is preferably such that each retainer means at least substantially fills the respective portion of the annular compartment so that each such retainer means can act not unlike a piston or plunger to displace the fluid medium in the compartment in response to angular displacement of the flange and the one flywheel relative to each other. Such piston or pistons can be provided with one or more peripheral recesses or notches and/or one or more holes for the passage of fluid medium therethrough (the fluid-displacing action of such notched, recessed or hollow piston or pistons is less satisfactory than that of a piston which is devoid of holes, notches and/or recesses and has a peripheral surface in immediate or close proximity to the surfaces bounding the adjacent portion or portions of the annular compartment).

The compartment can have a substantially constant cross-sectional area all the way from one of its ends to the other end (if it is not a circumferentially complete compartment) or in each and every portion thereof (if it constitutes an endless annular compartment). Alternatively, the compartment can have at least one first portion with a first cross-sectional area and at least one second portion with a different second cross-sectional area. The second cross-sectional area can exceed the first cross-sectional area and can be adjacent one end portion of one of the energy storing elements (e.g., in the form of arcuate coil springs) in the neutral positions of the first and second flywheels.

The damper means can include a first damper which comprises the aforementioned energy storing elements in the annular compartment, and at least one second damper which is preferably disposed radially inwardly of the first damper and can include additional energy storing elements. The flange is preferably provided with recesses for the energy storing elements in the compartment and with arcuate windows for the additional energy storing elements. The aforementioned arms alternate with the recesses and the flange is further provided with substantially radially extending webs which alternate with the windows and engage the additional energy storing elements. At least one spring retainer (such as the aforementioned cupped piston-like retainers) can be provided between at least one arm and the adjacent energy storing element in the annular compartment and/or between at least one of the webs and the adjacent additional energy storing element. The retainer or retainers can be provided with sockets and the adjacent arms or webs of the flange can be provided with projections (e.g., in the form of lobes) which extend into the sockets of the adjacent retainers in the circumferential direction of the one flywheel. Such projection(s) of the arm(s) or web(s) serves or serve to maintain the respective energy storing element(s) out of contact with the sections of the one flywheel or out of contact with the flange radially outwardly of the respective energy storing element or elements.

The second damper can be connected in parallel with the first damper, e.g., by way of the aforementioned flange. Alternatively, the first and second dampers can operate in series.

The energy storing elements of the damper means can form several groups (the energy storing elements of the first damper can form at least one group and the energy storing elements of the second damper can form one or more groups), and the flange and the sections of the one flywheel include means (such as the aforementioned abutments of or on the sections and the aforementioned arms and webs of the flange) for engaging at least two groups of energy storing elements during different stages of angular movement of the first and second flywheels relative to each other. The arrangement may be such that one group of energy storing elements of the second damper begins to store energy in immediate response to angular displacement of at least one flywheel from the neutral position, that another group of energy storing elements of the second damper begins to store energy after at least one of the flywheels completes a certain angular movement from the neutral position, and that the energy storing elements of the first damper begin to store energy simultaneously with the one or the other group or in response to a different angular displacement of at least one of the first and second flywheels from neutral position.

If the damper means includes two dampers, the windows for the energy storing elements of the second damper can be distributed in the flange in such a way that each window is located radially inwardly of a different recess for an energy storing element of the first damper. The length of each window (as seen in the circumferential direction of the one flywheel) can equal or approximate the length of a recess. The number of energy storing elements in the first and/or second damper need not exceed four.

Those sections of the one flywheel which define the annular compartment preferably include portions which are disposed radially inwardly of the compartment and define a preferably circumferentially complete annular passage which communicates with the compartment and is at least substantially filled by the rib or ribs of the flange. The flange can fill the passage to such an extent that it establishes with the one or the other section an annular gap having a width of 0.1–2 mm in the axial direction of the one flywheel. The gap can be a single gap or a composite gap having a first portion at one side and a second portion at the other side of the flange.

The energy storing elements of the second damper are preferably confined in arcuate grooves which are defined by the sections forming the annular compartment, and such grooves together form a second compartment for the respective energy storing elements. The aforementioned passage is disposed between the annular compartment and the grooves and communicates with the compartment as well as with the grooves. Those surfaces of the sections which bound the grooves can closely conform to the outlines of energy storing elements of the second damper. The energy storing elements of the second damper can also constitute coil springs which are prefabricated or pre-curved so as to have a curvature (prior to installation in the one flywheel) which equals or approximates the curvature of the arcuate grooves. The additional energy storing elements (of the second damper) can abut the rib or ribs of the flange under the action of centrifugal force when the one flywheel is set in rotary motion at an RPM which suffices to subject the additional energy storing elements to the action of a centrifugal force strong enough to tend to propel the additional elements radially outwardly and against the rib or ribs of the flange. Alternatively, or in addition to abutting the rib or ribs of the flange, the additional energy storing elements can abut the surfaces which bound the grooves, at least while the flywheels rotate and the additional elements are acted upon by centrifugal force. Each groove can constitute a circumferentially complete groove and can contain abutments for the additional energy storing elements; such abutments are provided on the sections of the one flywheel and cooperate with the webs of the flange to cause the additional elements to store energy in response to angular displacement of the abutments relative to the webs and/or vice versa. Each abutment can include one or more rivets which connect it to the one flywheel. Each abutment can be provided with a substantially flat surface which is in relatively large-area contact with the end portion of the adjacent additional energy storing element.

The additional energy storing elements can be located in the windows of two substantially disc-shaped members which flank the flange and are connected to the other flywheel. The flange then comprises means for connecting the first damper in series with the second damper.

The apparatus further comprises a coupling or connection which includes a first half on the first flywheel and a second half on the other flywheel. The coupling serves to transmit torque between the two halves which are in torque transmitting engagement with each other in predetermined axial positions of the first and second flywheels relative to each other. One half of the coupling can be provided on the flange and the other half of the coupling can be provided on the other flywheel (e.g., on a disc-shaped member which is bolted, riveted or otherwise secured to the other flywheel). The annular compartment can constitute a portion of an annular chamber which is defined by the one flywheel and which further includes the aforementioned passage for the flange and the aforementioned grooves for the additional energy storing elements. Such apparatus can further comprise means for sealing the chamber from the atmosphere, and the sealing means can include a sealing member on one of the flywheels and a sealing surface provided on the other flywheel and being engaged by the sealing member when the two halves of the coupling are assembled and can transmit torque. The halves of the coupling can comprise mating tooth-like projections which are separable from each other in response to axial shifting of at least one flywheel relative to the other flywheel from a predetermined axial position in which the projections of one half mate with the projections of the other half.

The compartment or compartments are preferably provided in the first flywheel, i.e., in that flywheel which can be driven by the output element of the engine if the apparatus is installed in a motor vehicle.

The fluid medium in the aforementioned chamber of the one flywheel preferably fills the annular compartment and the passage as well as a portion at least of the second compartment (including the aforementioned annular grooves) so that the additional energy storing elements are contacted by the fluid medium.

The apparatus can further comprise at least one friction generating device which operates between the two flywheels to oppose angular movements of such flywheels relative to each other, either during each stage or during selected stages of such angular movements. In other words, the friction generating device or devices can include means for opposing one or more predetermined portions of angular movement of the first and second flywheels relative to each other. The friction generating device or devices can be installed in or externally of the aforementioned chamber. Each friction generating device can operate in series with the first and/or second damper of the damper means. For example, at least one first friction generating device can operate in parallel with the first damper so as to oppose rotation of the flywheels relative to each other with a first force, and one or more additional friction generating devices can operate in parallel with the second damper to oppose rotation of the flywheels relative to each other with a different second force, preferably a lesser force.

The mutual spacing of abutments in the annular compartment and/or in the second compartment of the aforementioned chamber can exceed the length of at least one energy storing element in the respective compartment (as considered in the circumferential direction of the one flywheel).

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3a is an enlarged view of a detail within the phantom-line circle "X" of FIG. 3;

DESCRIPTION OF THE PREFERRED EMBODIMENTS

Figure 1:
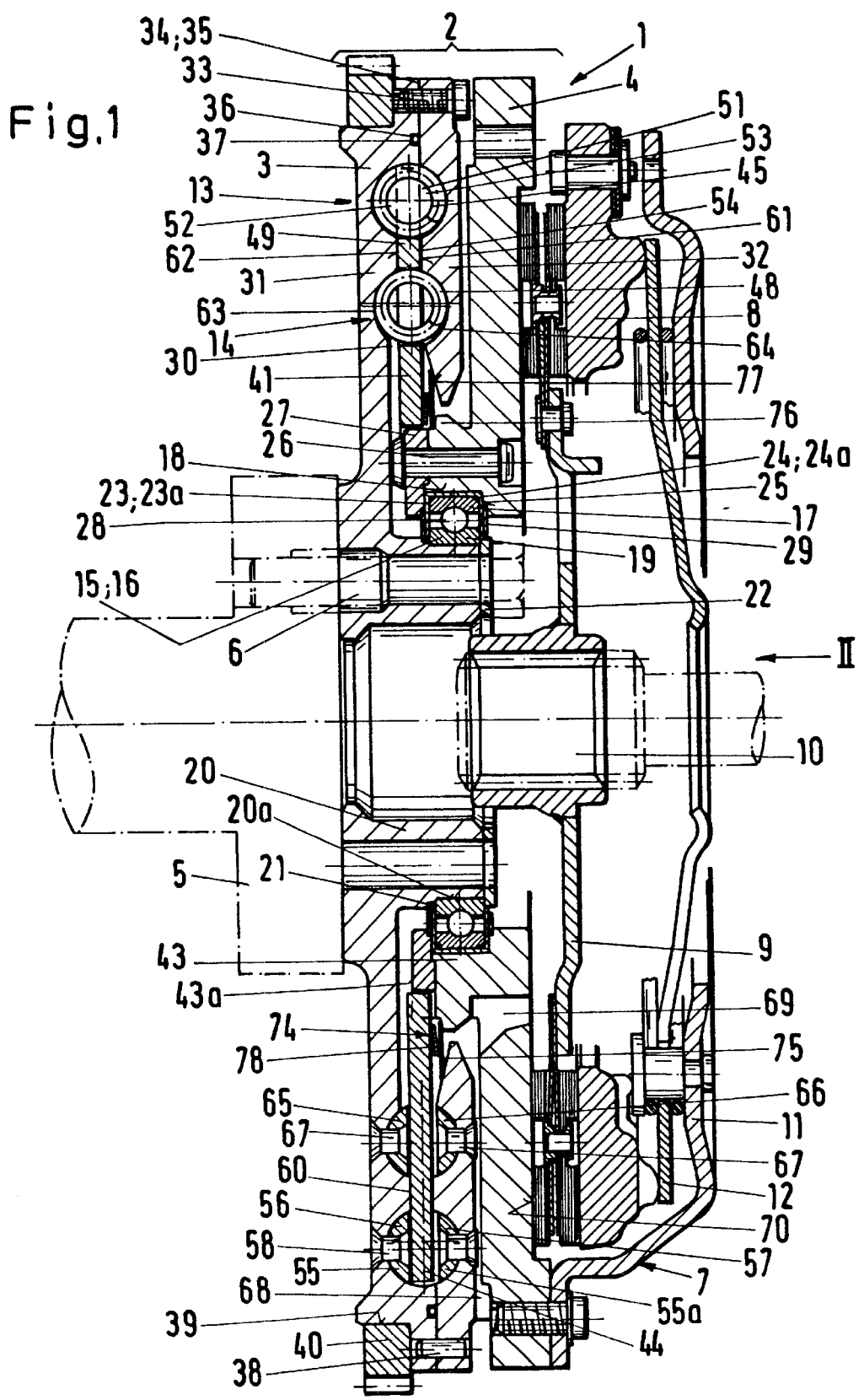
FIG. 1 is an axial sectional view of a torsional vibration damping apparatus which embodies one form of the invention.
Figure 2:
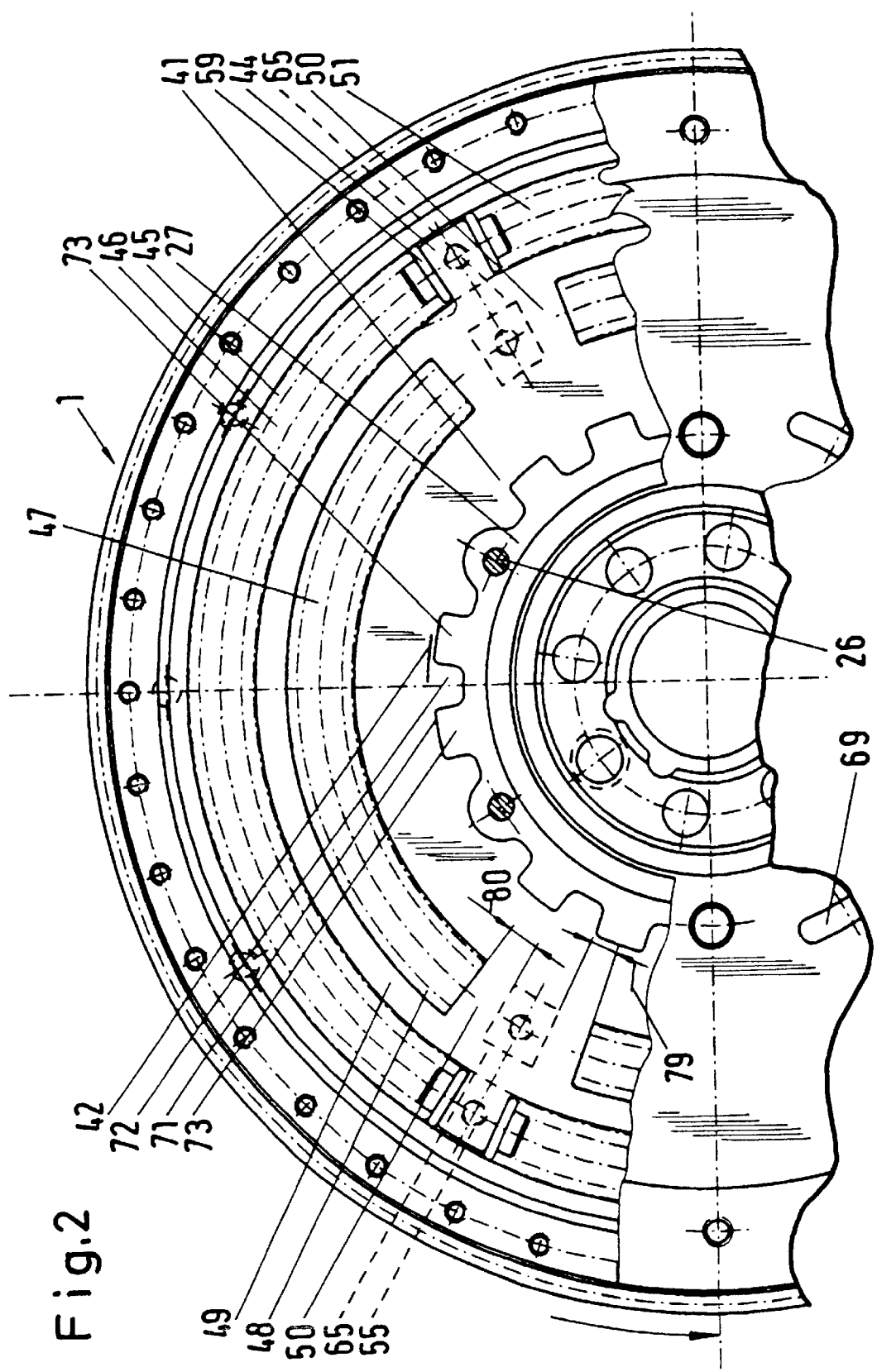
FIG. 2 is a fragmentary end elevational view as seen in the direction of arrow II of FIG. 1, with certain parts broken away.

FIGS. 1 and 2 show a torsional vibration damping apparatus 1 which comprises a composite flywheel 2 including a first component or flywheel 3 which is connectable to the output element 5 (such as a crankshaft) of an internal combustion engine by a set of bolts 6 or analogous fasteners, and a second component or flywheel 4 which is connectable to the input element 10 of a change-speed transmission by a friction clutch 7.

The friction clutch 7 comprises a pressure plate 8 which is axially movably coupled to the flywheel 4 by a clutch cover 11. The means for coupling the pressure plate 8 to the cover 11 includes a set of leaf springs two of which are shown in the upper right-hand portion of FIG. 1. The means for biasing the pressure plate 8 toward the friction surface 70 of the flywheel 4 comprises a diaphragm spring 12 which is tiltable between two ring-shaped seats at the inner side of the clutch cover 11. The friction clutch 7 further comprises a clutch plate or clutch disc 9 having a hub which is axially movably but non-rotatably mounted on the input element 10 of the transmission and has two sets of friction linings engageable with the surface 70 of the flywheel 4 and with the adjacent surface of the pressure plate 8, respectively. The means (not shown) for disengaging the clutch 7 can comprise an antifriction bearing which can be moved axially in the direction of arrow II to engage the tips of radially inwardly extending prongs forming integral parts of the diaphragm spring 12 and serving to change the conicity of the diaphragm spring so as to allow the pressure plate 8 to move axially and away from the friction surface 70 of the flywheel 4 and to thus enable the flywheel 4 to rotate relative to the clutch plate 9 and input element 10 of the transmission. The means for biasing the pressure plate 8 axially and away from the flywheel 4 includes the aforementioned leaf springs.

The flywheels 3 and 4 are rotatable relative to each other against the opposition of two dampers including an outer damper 13 and an inner damper 14. The two dampers are connected in parallel and include a common flange-like output member 41 (hereinafter called flange for short).

The apparatus 1 further comprises a bearing unit 15 including an antifriction bearing 16 with a single row of antifriction rolling elements in the form of spheres. The bearing 16 comprises an outer race 17 which is mounted in a centrally located recess 18 of the flywheel 4, and an inner race 19 which is mounted on a cylindrical peripheral surface or seat 20a of an axial protuberance 20 of the flywheel 3. The protuberance 20 extends into the recess 18 which is defined by an axial projection or extension 43 of the flywheel 4. The means for connecting the flywheels 3 and 4 to each other in predetermined axial positions comprises a retaining ring 22 which is affixed to the end face of the protuberance 20 so that it overlies the adjacent end face of the inner race 19 of the bearing 16. The inner race 19 is held in a predetermined axial position between a circumferential shoulder 21 of the protuberance 20 and the radially outermost portion of the retaining ring 22. This ring is secured to the protuberance 20 by the aforementioned bolts 6 which further serve to secure the flywheel 3 to the output element 5 of the internal combustion engine. The inner race 19 is preferably a press fit on the cylindrical seat 20a of the protuberance 20.

The means for locating the outer race 17 of the bearing 16 in a predetermined axial position with reference to the extension or projection 43 of the flywheel 4 includes a thermal barrier 25 comprising two rings 23, 24 which surround the periphery and the end faces of the race 17 and are recessed into the extension or projection 43. The ring 23 has a radially inwardly extending portion 23a which constitutes a means for sealing the space between the races 17, 19 from an annular internal chamber 30 of the flywheel 3. To this end, the ring portion 23a extends radially inwardly beyond the respective end face of the outer race 17, across the space between the races 17, 19 and along a portion at least of the respective end face of the inner race 19. The ring 23 can be installed in prestressed condition so that its portion 23a invariably bears against the respective end face of the inner race 19 and thus prevents leakage of lubricant (such as a grease) from the space between the races 17, 19 and into the radially innermost portion of the annular chamber 30 or vice versa. The ring 24 also comprises a radially inwardly extending portion 24a which extends along the respective end face of the outer race 17, across the space between the races 17, 19 and along the respective end face of the inner race 19. The portion 24a can bear against the inner race 19 due to innate elasticity of the ring 24 and due to mounting of such ring in prestressed condition. The outer race 17 is held against axial movement relative to the flywheel 4 by an internal shoulder of the extension 43 and by a disc-shaped member 27 (hereinafter called disc for short) which is rigidly secured to the extension 43 by a set of rivets 26 and engages a centering seat 43a of the extension 43.

In order to further enhance the sealing action of the radially inwardly extending portion 23a of the ring 23, the apparatus 1 further comprises a resilient element 28 in the form of a diaphragm spring which reacts against an internal shoulder of the disc 27 and bears against the radially innermost part of the ring portion 23a so that the latter is held in adequate sealing engagement with the inner race 19. Analogously, the radially innermost part of the ring portion 24a is biased against the respective end face of the inner race 19 by a resilient element in the form of a diaphragm spring 29 which reacts against an internal shoulder of the extension 43 and applies pressure to the radially innermost part of the ring portion 24a.

The chamber 30 contains a supply of preferably highly viscous fluid medium and is sealed from the surrounding atmosphere. In order to prevent leakage of lubricant from the space between the races 17, 19 of the antifriction bearing 16 into the innermost portion of the chamber and/or to prevent escape of fluid medium from the chamber 30 into the space between the races 17 and 19, the ring portion 23a preferably establishes a reliable seal between the respective end faces of the two races. This is particularly important if the fluid medium in the chamber 30 is not compatible with the lubricant for the rolling elements of the bearing 16. The provision of a reliable seal before the right-hand side of the space between the races 17 and 19 is also important in order to prevent flow of lubricant from the bearing 16 into the adjacent region around the hub of the clutch plate 9.

The thermal barrier 25 reduces the likelihood of overheating of lubricant in the bearing 16 and/or overheating of fluid medium in the chamber 30 as a result of repeated engagement or disengagement of the friction clutch 7. In other words, this thermal barrier prevents the transfer of excessive quantities of heat from the friction surface 70 of the flywheel 4 toward an annular inner section 32 which forms part of the flywheel 3 and constitutes the right-hand sidewall for the chamber 30. The left-hand sidewall or section is shown at 31. In addition, the thermal barrier 25 shields the bearing 16 from overheating as a result of repeated engagement and disengagement of the clutch 7.

The dampers 13, 14 which oppose rotation of the flywheels 3 and 4 relative to each other are installed in the chamber 30 of the flywheel 3. The radially outermost portions of the sections 31, 32 of the housing which defines the chamber 30 and forms part of the flywheel 3 are secured to each other by a set of screws 33 or analogous fasteners. This establishes a reliable seal between the radially extending abutting surfaces 34, 35 of the sections 31, 32, respectively. The escape of fluid medium from the radially outermost portion of the chamber is further prevented by a sealing element 36 (for example, an O-ring) which is installed in a circumferentially complete groove 37 in the surface 34 of the section 31. The ring 36 is located radially outwardly of an annular compartment 51 which constitutes the radially outermost portion of the chamber 30 and receives the component parts of the outer damper 13. The screws 33 connect the sections 31, 32 to each other radially outwardly of the sealing element 36.

The apparatus 1 further comprises a set of axially parallel centering pins 38 which are received in registering holes or bores provided therefor in the radially extending surfaces 34, 35 of the sections 31 and 32. The centering pins 38 facilitate the assembly of parts which form the apparatus 1, and more specifically the assembly of parts which form the flywheel 3.

The section 31 is nearer to the engine than the section 32 and has a cylindrical peripheral surface 39 which is surrounded by a ring-shaped starter gear 40. The gear 40 constitutes a stop against excessive leftward axial movement of centering pins 38 with reference to the section 31. This gear can be a press fit on the surface 39 or it can be welded or otherwise reliably secured to the section 31.

The sections 31, 32 can constitute castings. If it is desired to utilize a low-inertia flywheel 3, the section 31 and/or 32 of the flywheel 3 can be made of a light metal, such as an aluminum alloy. An advantage of such sections is that they can be shaped in response to the application of pressure in a press, in a stamping machine or in a like machine with a minimum of secondary treatment.

The output member or flange 41 of the dampers 13, 14 is disposed axially between the sections 31, 32 of the flywheel 3. As can be seen in FIG. 2, the radially innermost portion of the flange 41 has a central opening 71 which is surrounded by an annulus of tooth-like projections 72 constituting one portion or half of a coupling or connection 42 which can transmit torque between the flange 41 and the aforementioned disc 27. The second half or portion of the coupling 42 includes a set of radially outwardly extending tooth-like projections 73 at the periphery of the disc 27. The aforementioned cylindrical seat 43a of the extension 43 facilitates centering of the disc 27 in the radial direction of the flywheel 4.

The flange 41 has radially outwardly extending projections in the form of arms 44 which alternate with energy storing resilient elements 45 of the outer damper 13 in the annular compartment 51. The energy storing elements 45 are coil springs which are received in arcuate recesses windows 46 provided in the periphery of the flange 41 and alternating with the arms 44. The recesses 46 are located radially outwardly of arcuate windows 47 which are machined into or are otherwise formed in the flange 41 and receive energy storing elements in the form of coil springs 48 constituting component parts of the inner damper 14. The recesses 46 and windows 47 of the flange 41 are separated from each other by arcuate webs or ribs 49 which alternate with radially extending webs 50. The webs 50 further alternate with the windows 47 and perform the same function as the arms 44 of the flange 41 except that they abut the adjacent end convolutions of the coil springs 48.

The annular compartment 51 of the chamber 30 is defined primarily by two circumferentially complete annular grooves 52, 53 which are respectively machined into or are otherwise formed in the surfaces 34, 35 of the sections 31, 32 radially inwardly of the sealing element 36 and radially outwardly of similar grooves 63, 64 for the coil springs 48 of the inner damper 14. The grooves 52, 53 receive those portions of the coil springs 45 which extend axially beyond the respective sides of the flange 41. Analogously, the grooves 63, 64 receive those portions of the coil springs 48 which extend beyond the respective sides of the flange 41 radially inwardly of the ribs 49. The compartment 51 for the outer damper 13 can communicate with the compartment for the coil springs 48 of the inner damper 14 by way of a relatively narrow annular clearance or gap 54 which constitutes a small portion of a ring-shaped passage 62 between the circumferentially complete portions 60, 61 of surfaces 34, 35 of the sections 31 and 32. The gap 54 can be provided at the one or at the other side of the flange 41, or it can comprise two portions, one between the surface portion 60 and the flange 41 and the other between the surface portion 61 and the flange 41.

FIG. 1 shows that the grooves 52, 53 of the sections 31, 32 are bounded by arcuate surfaces which conform rather closely to the adjacent surfaces of the coil springs 45 in the annular compartment 51. This enables the sections 31 and 32 to act as a means for guiding the convolutions of the coil springs 45 when these springs expand or contract in response to angular displacement of the flange 41 and sections 31, 32 relative to each other. The convolutions of the coil springs 45 will tend to abut or will actually abut the surfaces bounding the grooves 52, 53 of the sections 31, 32 at least when the flywheel 3 rotates, i.e., when the coil springs 45 are acted upon by centrifugal force. It has been found that excessive localized wear upon the convolutions of the coil springs 45 can be reduced considerably if such coil springs are properly guided in the annular compartment 51. This is due to the fact that the area of contact between the sections 31, 32 and the coil springs 45 is increased considerably if the surfaces bounding the grooves 52, 53 can contact a substantial number of convolutions of each coil spring 45.

The coil springs 45 are acted upon by the arms 44 of the flange 41 and by pairs of inserts in the form of abutments or stops 55, 55a which are respectively provided in the grooves 52, 53 and are secured to the respective sections 31, 32 by rivets 58. The length of the illustrated abutments 55, 55a (as seen in the circumferential direction of the flywheel 3) equals or closely approximates the length or width of the arms 44 on the flange 41. These abutments respectively comprise separately produced parts 56, 57 which are riveted (at 58) to the respective sections 31, 32 of the flywheel 3. It is preferred to flatten those surfaces of the abutments 55, 55a which come into actual contact with the adjacent end convolutions of the respective coil springs 45.

FIG. 2 shows that the apparatus 1 can further comprise cup-shaped spring retainers 59 which are interposed between the arms 44 of the flange 41 and the adjacent end portions of the coil springs 45. The peripheral surfaces of the spring retainers 59 preferably conform to the outlines of the adjacent portions of surfaces bounding the grooves 52 and 53 of the sections 31, 32.

FIG. 1 further shows that the surfaces bounding the grooves 63, 64 of the sections 31, 32 closely conform to the outlines of coil springs 48 in the respective compartment of the chamber 30. This enables the convolutions of the coil springs 48 to abut and to be guided by the surfaces of the sections 31, 32, at least when the flywheel 3 rotates and the coil springs 48 are acted upon by centrifugal force. It is further desirable to properly guide the coil springs 45 and 48 against stray movements in the axial direction of the flywheel 3. Such stray movements could cause undesirable buckling of the coil springs.

It is preferred to provide the sections 31 and 32 with arcuate grooves 52, 63 and 53, 64, respectively, which are circumferentially complete recesses. This is advantageous if the surfaces of castings (sections 31 and 32) must be treated upon completion of the casting operation and prior to insertion of coil springs 45, 48 into the respective compartments of the chamber 30. Surfaces bounding circumferentially complete grooves can be more readily treated in available machine tools.

The grooves 63, 64 of the inner annular compartment of the chamber 30 respectively contain inserts in the form of abutments or stops 65, 66 which cooperate with the webs 50 of the flange 41 to deform the coil springs 48 of the inner damper 14. The abutments 65, 66 are preferably inserted in such a way that they fill the respective portions of the grooves 63 and 64, and they are secured to the sections 31, 32 of the flywheel 3 by rivets 67. As can be seen in FIG. 2, the length of abutments 65, 66 in the circumferential direction of the flywheels is less than the length or width of the webs 50 which form part of the flange 41. Each coil spring 48 is confined in its window 47 between a web 50 and a pair of abutments 65, 66. The coil springs 48 preferably abut the internal surfaces of the respective ribs 49 of the flange 41, at least when the flywheel 3 rotates so that the coil springs 48 are subjected to the action of centrifugal force.

It is preferred to make the flange 41 of steel or of a similar strongly wear resistant material. Furthermore at least a portion of the surface of the flange 41 (such as the internal surfaces of the ribs 49) is preferably hardened so as to further reduce the likelihood of pronounced wear upon the flange 41 when the apparatus is in use. The ribs 49 are preferably positioned in such a way that they reduce the area of contact between the coil springs 48 and the surfaces bounding the recesses 63, 64 in order to ensure that the sections 31, 32 of the flywheel 3 are not subjected to extensive wear. Another advantage of the feature that the convolutions of the coil springs 48 abut the internal surfaces of the respective ribs 49 is that the coil springs can share the angular movements of the flange 41 relative to the corresponding abutments 65, 66 without sliding along the ribs 49. Unnecessary slippage of coil springs 48 relative to the ribs 49 is undesirable because it can distort the characteristics of the outer damper 13.

FIG. 2 shows that the dampers 13 and 14 respectively comprise three coil springs 45 and 48. When the flywheels 3 and 4 assume the neutral positions of FIG. 2, each of the coil springs 45 extends along an arc of approximately 110° and each of the coil springs 48 extends along a similar arc, preferably not less than 100°. The three coil springs 45 together form approximately 91% of a complete circule, and the three coil springs 48 together form approximately 83% of a complete circle.

The coil springs 45 and 48 can be furnished while straight and are then bent during insertion into the respective grooves 52, 53 and 64, 65. This can result in the development of certain internal stresses which can be avoided if the coil springs 45 and 48 are shaped (prefabricated) so as to assume an arcuate shape even before they are inserted into the chamber 30. The curvature of pre-curved or prefabricated coil springs 45 and/or 48 can but need not exactly match the curvature of the respective annular compartments of the chamber 30. The utilization of pre-curved or prefabricated coil springs is desirable on the additional ground that it is much simpler to install them in the respective grooves of the sections 31 and 32.

The viscous fluid medium in the chamber 30 can constitute a lubricant, such as silicon oil or grease. The quantity of the fluid medium in the chamber 30 can be selected in such a way that, when the apparatus rotates, the supply of fluid medium fills the outer compartment 51 at least to the level of the axes of the coil springs 45. It is normally preferred to introduce a larger quantity of fluid medium so that the fluid medium preferably also fills the gap or clearance 54 between the dampers 13 and 14. In accordance with a presently preferred embodiment, the supply of fluid medium is selected in such a way that the medium fills the entire compartment 51, the entire gap 54 and the compartment for the coil springs 48 of the inner damper 14 to the level of the axes of coil springs 48. This ensures adequate lubrication of the coil springs 48, of the webs 50 and of the internal surfaces of ribs 49 which are normally engaged by the convolutions of the adjacent coil springs 48. It is often sufficient to select the quantity of the fluid medium in the chamber 30 in such a way that it fills the compartment 51 and the gap 54 and contacts at least the outermost portions of convolutions of the coil springs 48.

As mentioned before, the provision of the chamber 30 in that flywheel (3) which is more remote from the friction clutch 7 is advantageous and desirable on the ground that heat which is generated along the friction surface 70 of the flywheel 4 is less likely to adversely influence the characteristics (such as the viscosity) of the fluid medium in the chamber 30. Additional heat can be withdrawn and thus prevented from reaching the flywheel 3 due to the provision of an annular ventilating channel 68 which is disposed between the section 32 of the flywheel 3 and the flywheel 4 and is open along its radially outermost portion. The radially innermost portion of the channel 68 communicates with passages 69 which are provided in the flywheel 4 radially inwardly of the friction surface 70. As shown in FIG. 2, the passages 69 can be elongated in the circumferential direction of the flywheel 3. FIG. 1 shows that the passages 69 can comprise portions which are elongated in the radial direction of the flywheel 3.

An advantage of the aforementioned connection or coupling 42 is that the flange 41 can be properly positioned between the sections 31 and 32 of the flywheel 3 and also that the width of the gap 54 between the compartment 51 and the inner compartment of the chamber 30 can be reduced to a minimum. This enables the parts which define the gap 54 to constitute a highly effective flow restrictor which opposes the flow of viscous fluid medium between the dampers 13 and 14. An additional advantage of the coupling 42 is that it allows for the machining of certain parts, including the flange 41 and the adjoining parts, with larger tolerances which contributes to lower cost of the entire apparatus.

The means for preventing communication between the chamber 30 and the annular ventilating channel 68 comprises a sealing device 74 which operates between the radially innermost portion of the section 32 and the axial extension 43 of the flywheel 4. The sealing device 74 comprises a washer-like sealing member 75 having an inner marginal portion abutting a circumferentially complete surface 77 of the section 32. The radially innermost portion of the sealing member 75 surrounds a centering shoulder 76 of the extension 43. The sealing member 75 is biased axially against the surface 77 by a diaphragm spring 78 which reacts against the flange 41 and urges the sealing member 75 in a direction to the right, as seen in FIG. 1. The diaphragm spring 78 also biases the flange 41, namely against the portion 60 of the surface 34 of the section 31 so that the gap 54 normally develops only at one side of the flange 41, i.e., between this flange and the portion 61 of the surface 35 on the section 32.

The inner diameter of the disc-shaped member 75 which seals the chamber 30 from the annular ventilating channel 68 is greater than the outer diameter of the annulus of projections 73 on the disc 27 of the connection or coupling 42. The coupling 42 and the sealing device 74 allow for an extremely simple assembly of the apparatus 1. Thus, it is necessary to first assemble the parts of the apparatus 1 into two subassemblies one of which includes the flywheel 3 and the other of which includes the flywheel 4. The two subassemblies are then connected to each other by inserting the protuberance 20 into the inner race 19 of the bearing 16 and by attaching the retaining ring 22 to the protuberance 20 so that the outer marginal portion of the ring 22 overlies the inner race 19. The sealing member 75 is mounted on the flywheel 3 prior to attachment of the flywheels 3 and 4 to each other, and the bearing 16 is mounted in the flywheel 4 prior to such attachment. During assembly, the inner race 19 is slipped onto the seat 20a of the axial protuberance 20 of the flywheel 3, and more particularly of the section 31 of the flywheel 3, whereby the projections 73 of the disc 27 move into mesh with the projections 72 of the flange 41 so that the coupling or connection 42 is ready to transmit torque between the disc 27 and the flange 41. At the same time, the sealing member 75 comes into sealing engagement with the shoulder 76 and surface 77 of the projection 43 of the flywheel 4 so that the sealing member 75 is tilted relative to the diaphragm spring 78 and bears against the surface 77 with a force which is required to establish a satisfactory sealing action. As mentioned above, the final axial positioning of the flywheels 3, 4 relative to each other is effected by the retaining ring 22 which must be affixed to the protuberance 20 of the flywheel 3. In the embodiment which is shown in FIGS. 1 and 2, the bolts 6 are used to affix the ring 22 to the protuberance 20; however, it is equally possible to employ a set of separate bolts, screws, or rivets, not shown.

In order to reduce wear upon the surfaces bounding the grooves 52, 53 and 63, 64 of the sections 31, 32 as a result of repeated frictional engagement with the convolutions of the coil springs 45 and 48, it is advisable to harden the respective portions of the sections 31 and 32. This is possible by treating the corresponding portions of sections 31 and 32 in an induction hardening, insert hardening, laser beam hardening or flame hardening apparatus. The exact nature of the hardening treatment forms no part of the invention. All that counts is to ensure that the wear upon the sections 31, 32 is reduced and that the apparatus 1 can stand long periods of use. It is also possible to avoid actual hardening of selected portions of sections 31 and 32 if such selected portions are provided with coats or layers of wear-resistant material. The coating can be effected by providing selected portions of the sections 31, 32 with layers of chemically applied nickel, with layers of chromium, with layers of molybdenum or with layers of a synthetic plastic material. The thus applied coats or layers can be subjected to a suitable smoothing treatment in order to enhance the surface quality of the sections 31, 32 in the regions of the grooves 52, 53 and 63, 64. For example, the surface finish can be improved by treating the material around the grooves 52, 53 and 64, 65 in a suitable grinding or milling machine.

The mode of operation of the apparatus 1 of FIGS. 1 and 2 is as follows:

When the flywheel 4 is caused to leave the neutral angular position of FIG. 2 with reference to the flywheel 3, the coupling 42 transmits torque to the flange 41 so that the coil springs 45 of the outer damper 13 begin to store energy because they are compressed between the arms 44 of the flange 41 and the abutments 55, 55a in the grooves 52, 53 of the sections 31, 32. When the flywheel 4 completes an angle 79 in one direction or an angle 80 in the other direction, the abutments 65, 66 in the grooves 63, 64 engage the respective end portions of coil springs 48 of the inner damper 14 so that, if the flywheel 4 continues to turn relative to the flywheel 3, the coil springs 48 are compressed by the webs 50 and abutments 65, 66 simultaneously with further compression of coil springs 45 by the arms 44 and abutments 55, 55a. Such angular displacement of the flywheel 4 relative to the flywheel can continue until the coil springs 45 reach the stage of maximum compression so that each of these coil springs constitutes or acts not unlike a solid block which cannot undergo any additional compression in the circumferential direction of the flywheels 3 and 4.

In the embodiment of FIGS. 1 and 2, the maximum angle through which the flywheel 4 can turn relative to the flywheel 3 and/or vice versa (starting from the neutral positions of the flywheels 3 and 4 shown in FIG. 2) is approximately or exactly 47°.

The apparatus 1 produces a frictional damping action as a result of angular displacement of the flywheel 3 relative to the flywheel 4 and/or vice versa because the coil springs 45 of the outer damper 13 rub against the surfaces bounding the grooves 52, 53 of the sections 31 and 32. At the same time, the flange 41 rubs axially against the portion 60 of the internal surface 34 of the section 31 under the action of the diaphragm spring 78 for the sealing member 75. Additional frictional damping action takes place as a result of rubbing contact between the coil springs 48 of the inner damper 14 and the surfaces which are adjacent thereto. The frictional damping action between the coil springs 45, 48 on the one hand and the adjacent surfaces on the other hand is a function of the rotational speed of the apparatus 1. Thus, as the RPM of the apparatus 1 increases, the frictional damping action also increases because the magnitude of centrifugal force acting upon the coil springs 45, 48 increases and these springs are biased against the adjacent surfaces which a progressively increasing force.

Additional damping action is generated as a result of turbulence in and displacement of the viscous (normally pasty) fluid medium in the annular chamber 30. The fluid medium which is confined in the nearly completely sealed annular compartment 51 for the coil springs 45 of the outer damper 13 produces a highly pronounced viscous or hydraulic damping action because the cup-shaped spring retainers 59 act not unlike pistons or plungers and displace the fluid medium in the circumferential direction of the flywheel 3. When the coil springs 45 in the compartment 51 are caused to store energy, the spring retainers 59 which are shifted by the arms 44 of the flange 41 are moved in a direction toward the spring retainers 59 (if any) which are in abutment with the corresponding stops 55, 55a so that the viscous fluid medium which is expelled from the interior of coil springs 45 is forced to flow into the gap 54 wherein the flow of fluid medium is restricted due to the narrowness of the gap. In other words, the parts which define the gap 54 act not unlike a flow restrictor. A certain amount of fluid medium is also caused to flow around the peripheral surfaces of the spring retainers 59 and this also produces a desirable hydraulic or viscous damping action.

The fluid medium which has flown radially inwardly is compelled to flow back into the compartment 51 as soon as possible because it is being acted upon by centrifugal force whereby the parts which define the gap 54 again perform a damping action. Additional damping action is generated during expansion of coil springs 45 as a result of the flow of fluid medium around the spring retainers 59. The spaces within the convolutions of the coil springs 45 are again filled with fluid medium, partly as a result of the flow of fluid medium around the spring retainers 59 and mainly as a result of the flow of fluid medium through the gap 54 and into the annular compartment 51. The damping action which is generated by the viscous fluid medium is a function of the rotational speed of the apparatus 1, namely of the centrifugal force which increases with increasing rotational speed of the flywheels 3 and 4.

Additional viscous or hydraulic damping action is generated by the coil springs 48 of the inner damper 14, partly as a result of agitation of the fluid medium in the compartment including grooves 63, 64 and in part as a result of expulsion of such fluid medium from or as a result of return flow of fluid medium into the convolutions of the coil springs 48.

The damping action can be regulated and varied in a number of ways. For example some or all of the spring retainers 59 can be provided with notches, grooves or similar recesses in their peripheral surfaces so as to facilitate the flow of fluid medium around such spring retainers. Additional reduction of resistance of the spring retainers 59 to the flow of fluid medium can be achieved by providing such spring retainers with through holes or bores which may but need not be identical in all or some of the spring retainers. Still further, the damping action can be regulated by a proper selection of the total area of the gap 54 between the flange 41 and the section 32 of the flywheel 3. Moreover, the damping action can be regulated by removing one or more spring retainers 59 and/or by adding spring retainers for those coil springs 45 and/or 48 which are not provided with such spring retainers from the start. Spring retainers can be provided on some or all of the coil springs 48 and/or on all or some of the coil springs 45.

An important advantage of the improved apparatus is that the coil springs 45 and 48 of the dampers 13 and 14 are properly guided in their respective compartments 51 and 63, 64 even if they are relatively long or very long. This, in turn, renders it possible to allow for large angular displacements of the flywheels 3 and 4 relative to each other, namely through angles of at least 25 degrees and, if necessary, well in excess of 25 degrees. The ability of the flywheels 3 and 4 to perform large angular movements relative to each other enhances the ability of the apparatus to damp vibrations because the damping angle per increment can be relatively small but the overall damping action (through an angle of 25 or more degrees) is still highly satisfactory and, in fact, much more satisfactory than that which can be obtained with conventional vibration damping apparatus. The arrangement is such that the damping rate is small over a relatively large portion of the angle, or even over the entire angle, which can be covered by the flywheel 3 and/or 4 relative to the other flywheel. The damping rate can be lowered proportionally with an increase of the extent of angular movability of the flywheels relative to each other.

The damper 13 and/or 14 can employ relatively long coil springs or other suitable energy storing elements each of which is a one-piece body and each of which is or can be relatively soft and can undergo a pronounced expansion or contraction. This renders it possible to achieve the aforementioned desirable low damping rate. The ability of the flywheels 3 and 4 to perform large angular movements relative to each other and the possibility of using long coil springs having a low damping rate render it possible to damp large-amplitude vibrations, i.e., to compensate for peaks of torque acting in a clockwise or in a counterclockwise direction, as well as to damp small-amplitude vibrations, i.e., relatively small fluctuations of torque which is transmitted by the output element of the engine to the power train including the change-speed transmission or vice versa. The just outlined features of the apparatus render it possible to effectively damp practically all types of vibrations which are likely to develop between the engine and the power train of a motor vehicle.

It has been found that the operation of the improved apparatus is particularly satisfactory if the stiffness of the coil springs is between 2–20 Nm/°. It is further advantageous if such spring rate or stiffness is effective through an angle of at least 15 degrees in both directions, i.e., when the engine drives the input element of the transmission as well as when the vehicle is coasting.

Another important advantage of relatively long energy storing elements and of the feature that the arms 44 and webs 50 of the flange 41 can cover long distances with reference to the sections 31, 32 of the flywheel 3 and/or vice versa is that the viscous fluid medium in the chamber 30 is subjected to a pronounced agitating action and that large quantities of fluid medium can be expelled from and caused to flow back into the respective compartments of the chamber to be thereby subjected to a pronounced throttling action during flow through the gap 54. This results in the generation of a pronounced hydraulic or viscous damping action whose intensity fluctuates as a function of changes of rotational speed of the composite flywheel and resulting changes of the magnitude of centrifugal force. The hydraulic or viscous damping action also varies as a function of the extent and abruptness of fluctuations of torque which is being transmitted between the flywheels 3 and 4, i.e., as a function of the extent of angular movement and the extent of acceleration or deceleration of the flywheels relative to each other.

As mentioned above, the intensity of the hydraulic or viscous damping action is dependent on the RPM of the flywheels 3 and 4, i.e., not the RPM of the output element of the engine. Thus, the damping ratio or hysteresis and hence the overall damping characteristics of the apparatus can be varied in dependency on the angular velocity of the flywheels relative to each other and also as a function of changes of the RPM of the engine. It has been found that the apparatus can effectively damp large-amplitude vibrations as well as vibrations of small amplitude, i.e., vibrations which are caused by pronounced surges of torque as well as vibrations which must be counteracted with a relatively small hysteresis. Small-amplitude vibrations are likely to develop when the engine is operated under load. One of the reasons for the above outlined advantages of the improved apparatus is believed to be that the pressure which develops in the fluid medium depends upon the velocity with which a certain volume of the fluid medium is being displaced. In other words, the ability of the fluid medium in the chamber 30, and particularly in the compartment 51, depends upon the nature and magnitude of variations of transmitted torque. This enables the apparatus to automatically conform the damping action to the prevailing requirements. In other words, the damping action is regulated automatically as a function of changes in the magnitude and/or nature of deviations of transmitted torque from that which does not involve any angular displacement of the flywheels 3 and 4 relative to each other.

The length of the coil springs 48, 45 and of the windows 47 and recesses 46 is preferably selected in such a way that each coil spring is normally in contact with the adjacent webs 50 and arms 44, at least when the flywheels 3 and 4 rotate. This is particularly desirable and advantageous if the coil springs are arranged to undergo compression and to store energy during different stages of angular movement of the flywheels 3 and 4 relative to each other, i.e., if the damper means including the dampers 13, 14 is to produce a multi-stage damping action. Consequently, those springs which do not store energy in immediate response to angular movements of the flywheels relative to each other can share the angular movements of the flange to avoid the development of undesirable frictional damping action between such springs and the flange.

The abutments 55, 55a and 65, 66 can constitute mass-produced plate-like, rivet-shaped or analogous parts which are riveted, welded, screwed or otherwise reliably affixed to the respective sections 31, 32 of the flywheel 3. The making of separate abutments renders it possible to form the sections with circumferentially complete annular grooves 52, 53 and 63, 64 which simplifies the making of the sections, especially in a casting machine.

The number of stages of operation of the damper means can be varied practically at will, e.g., by appropriate distribution of the abutments in the grooves 52, 53 and 63, 64 with reference to the arms 44 and webs 50. As mentioned above, the abutments can be flush with the arms at one side but project beyond or are recessed with reference to the arms and webs at the other side, or they can be recessed or can project beyond both sides of the respective arms and webs. As also mentioned above, the arrangement can be such that the coil springs 45 and/or 48 are not compressed at all during the initial stage of angular movement of at least one of the flywheels 3, 4 relative to the other flywheel from the neutral position of FIG. 2. At such time, the apparatus 1 merely produces a hydraulic or viscous damping action or a frictional damping action, such as due to rubbing contact between the sealing member 75 and the surface 76 of the flywheel 4. This hydraulic or viscous and/or frictional damping action can be small or very small.

It is preferred to use relatively narrow arms 44 and/or webs 50 (in comparison with the abutments in the respective compartments of the chamber 30) in apparatus wherein the coil springs are installed in unstressed condition (in the neutral positions of the flywheels relative to each other) and are engaged and held in selected positions (circumferentially of the flywheel 3) by the abutments in the respective compartments.

If the apparatus is designed to have one or more coil springs turn with the flange during the initial stage of angular displacement of one of the flywheels with reference to the other flywheel before these coil springs begin to store energy, it is desirable that at least one arm 44 or web 50 of the flange 41 be dimensioned to have a width (in the circumferential direction of the flywheel 3) which is greater than that of the adjacent abutments in the compartment 51 or in the compartment including the grooves 63, 64. The arrangement can be such that the one arm or web is flush with the abutment at one of its sides but out of register with the abutment at the other side.

The dampers 13 and 14 can be connected in parallel or in series. The coil springs of each of these dampers are connected in parallel, and such coil springs can form two or more groups which are caused to store energy during different stages of angular displacement of the flywheel 3 relative to the flywheel 4 and/or vice versa. For example, each of the coil springs 45 can be constructed and mounted to proceed to store energy in response to a different angular displacement of the one or the other flywheel from its neutral position.

It is presently preferred to employ a relatively small number of coil springs in each of the dampers 13 and 14. This brings about the afore discussed advantage that the dampers can employ relatively long coil springs which can undergo extensive compression and thus enable the flywheels 3 and 4 to turn angles with reference to each other. The number of coil springs 45 or 48 need not exceed four.

It is further possible to design the flange 41 and/or the sections 31, 32 of the flywheel 3 in such a way that the width of the gap 54 (or the cross-sectional area of the entire gap) changes in response to angular displacement of the flywheels 3 and 4 relative to each other. For example, the cross-sectional area of the gap 54 can decrease if the flywheel 3 and/or 4 is caused to leave the neutral position of FIG. 2. In other words, the damping action of the flow restrictor means including the parts which define the gap 54 increases with increasing angular displacement of the flywheels with reference to each other. For example, at least one side of the flange 41 can be provided with circumferential extending and axially sloping ramps which cooperate with complementary ramps on the surface portion 60 or 61 in such a way that the area which is available for the flow of viscous fluid medium to or from the compartment 51 is reduced as the flywheel 3 and/or 4 continues to move away from its neutral position.

Pre-bending or pre-curving of coil springs 45 and/or 48 is desirable and advantageous for the afore discussed reasons as well as because these springs are preferably long. Moreover, such pre-bending ensures that the installed coil springs 45 and/or 48 are not subjected to any or to any appreciable bending stresses.

The coil springs 45 and 48 are preferably mounted in such a way that they are guided primarily by the surfaces bounding the radially outermost portion of the compartment 51 and by the internal surfaces of the ribs 49. This reduces the wear upon the surfaces surrounding the grooves 52, 53 and 63, 64. In other words, the coil springs 48 are guided by the sections 31, 32 solely against deflection in the axial direction of the flywheel 3, and the coil springs 45 are guided by the sections 31, 32 solely or primarily against movement radially outwardly (under the action of centrifugal force) so that the wear upon the major portions of surfaces bounding the grooves 52, 53 is not extensive. The end portions of the recesses 46 and/or windows 47 can be configured in such a way that the end portions of the respective coil springs 45, 48 are pulled radially inwardly and are out of frictional contact with the radially outermost portions of surfaces bounding the compartment 51 and/or with the end portions of ribs 49 adjacent the webs 50. To this end, the end portions of the recesses 46 and/or the end portions of the windows 47 can be bent inwardly toward the axis of the flywheel 3.

However, and especially if the coil springs 48 are to become effective only after the flywheel 3 and/or 4 already completes a certain angular displacement from its neutral position, the mounting of such coil springs is or can be such that they bear against the adjacent ribs 49 with a force which increases with increasing rotational speed of the flywheel 3. This ensures that the coil springs 48 will not slide relative to the adjacent ribs 49 except when necessary in order to enable or cause them to store energy.

The manner in which the parts of the apparatus 1 can be connected with each other to form two subassemblies which are ready to be connected to each other by causing the projections 72 of the coupling 42 to engage the projections 73 is disclosed in the commonly owned copending patent application Ser. No 07/617,918.

The feature that the two halves of the coupling 42 are not fixedly secured to each other in the axial direction of the flywheel 3 is desirable and advantageous because the flange 41 is free to find for itself an optimum position between the sections 31, 32 of the flywheel 3 and because it is not necessary to machine the flange and/or the parts which are adjacent thereto with a very high degree of precision. Moreover, such construction of the coupling 42 renders it possible to compensate for certain machining tolerances. Still further, such design of the coupling 42 ensures that the apparatus 1 does not develop a pronounced frictional hysteresis in response to small angular displacements of the flywheel 3 relative to the flywheel 4 and/or vice versa while the engine is idling. Highly satisfactory results are obtained if the flywheel 41 is mounted in such a way that it actually floats between the sections 31 and 32 of the flywheel 3.

Figure 3:
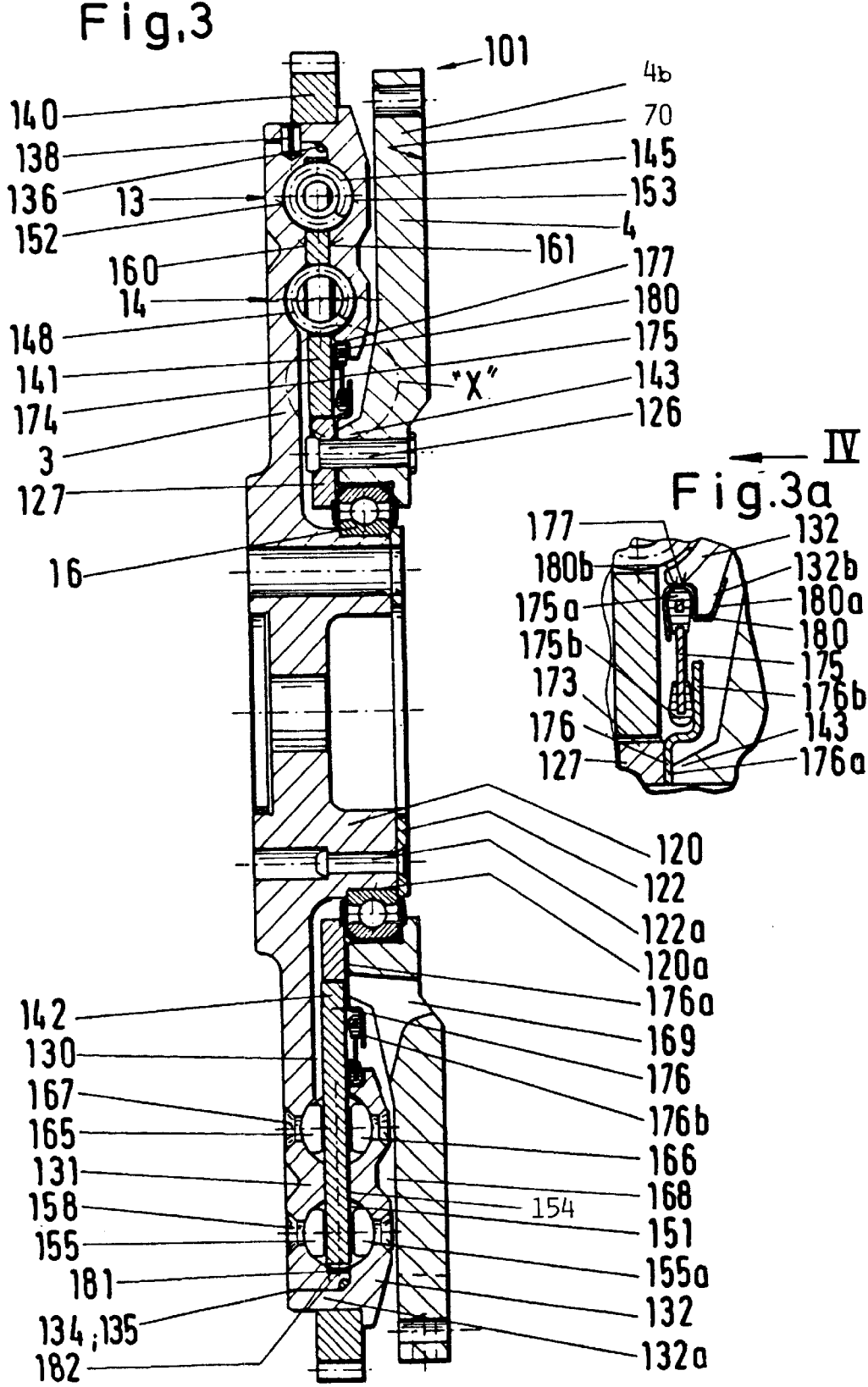
FIG. 3 is an axial sectional view of a second torsional vibration damping apparatus.
Figure 4:
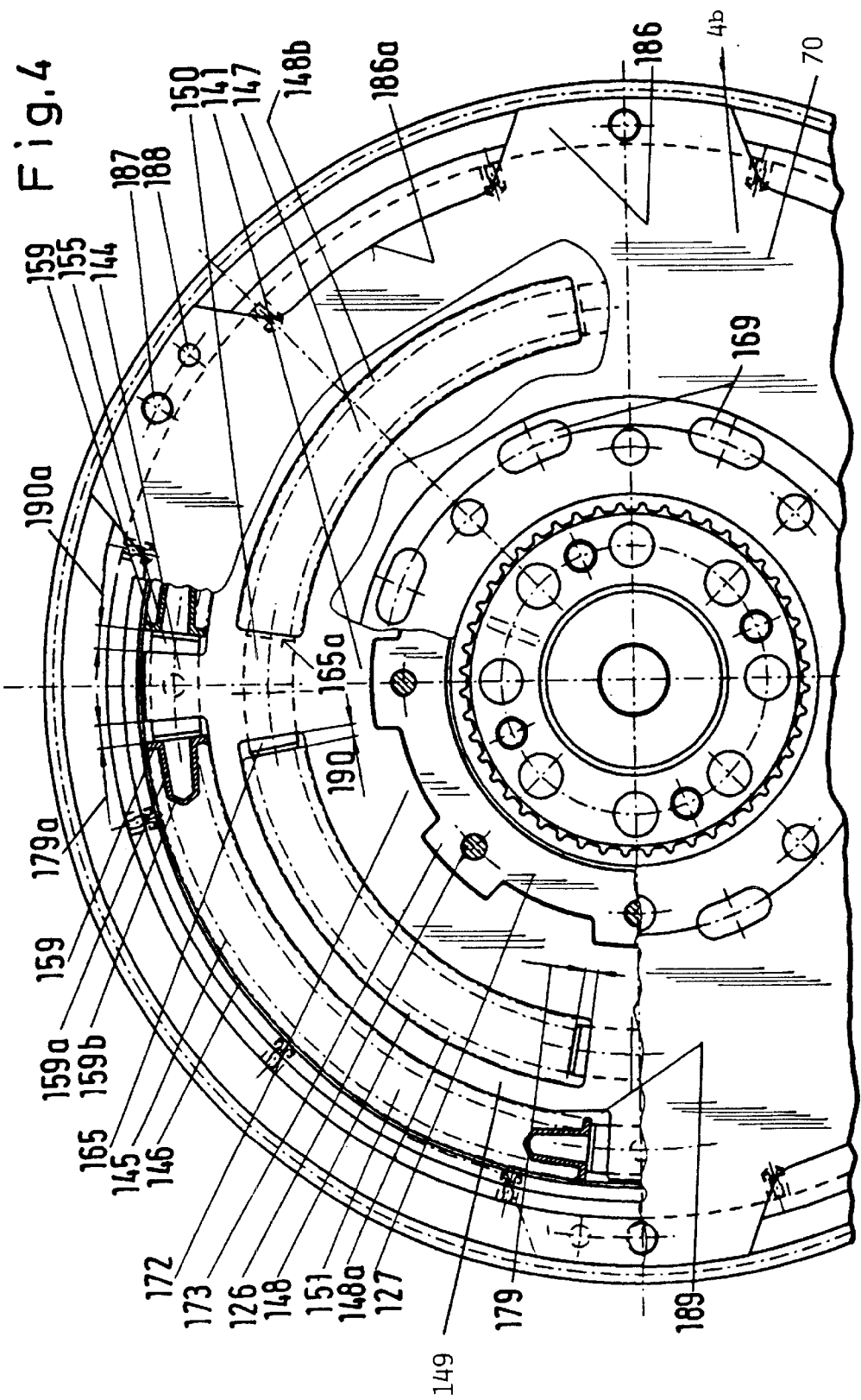
FIG. 4 is a fragmentary end elevational view as seen in the direction of arrow IV in FIG. 3, with certain parts broken away.

Referring to FIGS. 3, 3a and 4, there is shown a second torsional vibration damping apparatus 101 wherein nearly all such parts which are identical with or clearly analogous to the corresponding parts of the apparatus 1 are denoted by similar reference characters plus 100. The antifriction bearing 16 is interposed between the flywheels 3 and 4 substantially in the same way as described in connection with FIG. 1. A ring-shaped retainer 122 is used to engage the inner race of the bearing 16 when the apparatus 101 is fully assembled, and such retainer is secured to the axial protuberance 120 of the flywheel 3 by a set of rivets 122a or analogous fasteners. These fasteners ensure that the retainer 122 abuts the end face of the protuberance 120.

The flywheels 3 and 4 are assembled into the apparatus 101 in a manner which is similar to that described above in connection with FIGS. 1 and 2. In other words, the bearing 16 is installed first in the flywheel 4, and the inner race of the thus installed bearing 16 is thereupon slipped onto the cylindrical seat 120a of the axial protuberance 120 of the flywheel 3. A sealing device 174 is installed on the flywheel 3 before the two flywheels are connected to each other, and such connection involves the activation or complete assembly of the coupling or connection 142 which can transmit torque between the disc 127 on the flywheel 4 and the flange 141 which constitutes the output member of the dampers 13 and 14.

The sections 131 and 132 of the flywheel 3 define the annular chamber 130 and each of these sections is a casting. The periphery of the section 132 is provided with an axially extending cylindrical portion 132a having a cylindrical internal surface 135 which is centered by the cylindrical peripheral surface 134 of the section 131. The sections 131, 132 are held against axial movement relative to each other by radially extending centering members or pins 138 received in radially extending recesses or holes provided therefor in the surfaces 134 and 135. The section 132 carries a ring-shaped starter gear 140 which partially overlies the radially outermost portions of the centering pins 138 so that such pins are held against expulsion radially outwardly under the action of centrifugal force when the apparatus 101 is driven by the engine or by the change-speed transmission.

The coupling 142 includes an annulus of tooth-like projections 173 at the periphery of the disc 127, and a set of complementary tooth-like projections 172 surrounding the central opening of the flange 141.

As shown in FIG. 3a, the sealing device 174 for the radially innermost portion of the chamber 130 comprises a washer-like sealing member 175 which operates between the radially innermost portion 132b of the section 132 and the dished outer marginal portion 176b of a sealing member or insert 176. The sealing member 176 has an inner marginal portion 176a which is clamped between the projection or extension 143 of the flywheel 4 and the disc 127. The sealing member 175 is deformable and is elastic in the axial direction of the flywheels 3, 4 and has an inner marginal portion 175b which bears against the outer marginal portion 176b of the sealing member 176. The outer marginal portion 175a of the sealing member 175 is engaged and held against axial movement by a ring-shaped carrier 180 which is mounted on the radially innermost portion 132b of the section 132. When deformed, the sealing member 175 resembles the frustum of a hollow cone and acts not unlike a diaphragm spring. The marginal portions 175a and 175b of the sealing member 175 are provided with layers or coats of a plastic material which has a low coefficient of friction and exhibits at least some elastic or plastic deformability. The layers of such plastic material can be sprayed onto the respective marginal portions of the sealing member 175. The carrier 180 has a collar 180a which overlies the right-hand side of the section 132, and a socket 180b which is received in a complementary ring-shaped notch 177 in the radially innermost portion 132b of the section 132 and confines the outer marginal portion 175a of the sealing member 175 to swiveling movements relative to the section 132. Such swiveling enables the sealing member 175 to change its conicity during final stages of assembly of the flywheels 3 and 4 with each other, namely when the inner marginal portion 175b of the sealing member 175 begins to bear against the dished outer marginal portion 176b of the sealing member or insert 176. The carrier 180 can be said to constitute a bearing which enables the outer marginal portion 175a of the sealing member 175 to perform the aforementioned tilting or swiveling movements relative to the section 132 and sealing member 176. The dished outer marginal portion 176b of the sealing member 176 is offset with reference to the inner marginal portion 176a in a direction away from the disc 127 and flange 141. The sealing device 174 of FIG. 3a establishes an airtight seal between the radially innermost portion of the annular chamber 130 and the adjacent portion of the annular ventilating channel 168 between the section 132 of the flywheel 3 and the flywheel 4.

In order to allow for convenient assembly of the flywheels 3 and 4, the inner diameter of the sealing member 175 exceeds the outer diameter of the annulus of projections 173 on the disc 127. Furthermore, the diameter of the outer marginal portion 176b of the sealing member 176 exceeds the diameter of the inner marginal portion 175b of the sealing member 175. This ensures that the inner marginal portion 175b automatically engages and is displaced by the outer marginal portion 176b when the projections 173 of the coupling 142 are brought into mesh with the projections 172 of the flange 141. As mentioned above, the coupling 142 becomes operative to transmit torque between the disc 127 and the flange 141 in automatic response to slipping of the inner race of the bearing 16 onto the seat 120a on the protuberance 120 of the flywheel 3 so that the ring-shaped retainer 122 can be attached by the rivets 122a and abuts the end face of the protuberance 120.

In order to reduce wear between the convolutions of the coil springs 145 (forming part of the outer damper 13) and the adjacent surfaces, the flywheel 3 is preferably provided with a short cylindrical member 181 of highly wear-resistant material which is installed in a shallow recess 182 forming the outermost portion of the annular compartment 151 for the coil springs 145. When the apparatus 101 is driven, the coil springs 145 are acted upon by centrifugal force and their convolutions bear against the cylindrical internal surface of the member 181. If desired, the member 181 can be provided with a concave internal surface so as to further increase the area of contact between the member 181 and the coil springs 145.

The abutments 155, 155a for the coil springs 145 of the outer damper 13 and the abutments 165, 166 for the coil springs 148 of the inner damper 14 are preferably prefabricated parts which can be made by casting, forging, pressing or the like and which can be provided with integral rivets 158, 167, respectively, for attachment to the respective sections 131, 132 of the housing defining the annular chamber 130 and forming part of the flywheel 103.

FIG. 4 shows that the abutments 155, 155a at opposite sides of the arms 144 of the flange 141 are longer than the respective arms 144. The arms 144 are disposed midway between the respective abutments 155, 155a; in other words, the abutments 155, 155a extend through identical distances beyond the respective arms 144 in the circumferential direction of the flywheels 3 and 4 when the flywheels assume the neutral positions of FIG. 4.

The abutments 165, 166 cooperate with the webs 150 of the flange 141 to compress the coil springs 148 in response to angular displacement of the flywheel 3 relative to the flywheel 4 and/or vice versa. As can be seen in FIG. 4, the abutments 165, 166 are longer than the respective web 150 (as seen in the circumferential direction of the flywheels). However, the positioning of abutments 165, 166 with reference to the radially extending webs 150 is such that the abutments 165, 166 which are associated with one of the webs 150 project to one side of such web whereas the abutments 155, 166 which are associated with the neighboring web 150 extend beyond the other side of the associated web or are flush with the respective web. In addition, the offset of abutments 165, 166 relative to the radially extending webs 150 is such that neighboring webs 150 and the associated abutments 165, 166 are offset relative to each other in opposite directions. Consequently, the coil springs 148 of the inner damper 14 constitute two groups 148a and 148b which become active during different stages of angular displacement of the flywheel 3 relative to the flywheel 4 and/or vice versa. In other words, the coil springs of the group 148b begin to store energy in response to angular displacement of the flywheel 3 or 4 relative to the other flywheel through a first angular distance whereas the coil springs 148 of the group 148a begin to store energy when the flywheels turn through a different angle relative to each other.

The annular chamber 130 between the sections 131, 132 of the flywheel 3 contains a supply of a viscous fluid medium which is preferably a lubricant, for example, silicon oil or grease. The fluid medium fills at least the annular compartment 151 of the chamber 130. It is presently preferred to select the quantity of fluid medium in the chamber 130 in such a way that the fluid medium is in continuous contact at least with the radially outermost portions of convolutions of coil springs 148 forming part of the inner damper 14. In accordance to a presently preferred embodiment of the invention, the supply of viscous fluid medium fills the compartment 151, the gap 154 and that portion of the annular compartment for the coil springs 148 which is located radially outwardly of the axes of these coil springs.

The apparatus 101 also comprises cupped spring retainers 159 which are interposed between the arms 144 of the flange 141 and the adjacent end portions of the coil springs 145 in the recesses 146 and/or between the abutments 155, 155a and the respective end portions of the coil springs 145. The peripheral surfaces of the retainers 159 are or can be closely adjacent the surfaces bounding the compartment 151 so as to ensure that the retainers 159 act not unlike plungers or pistons when they are caused to move relative to sections 131, 132 or with such sections in response to angular displacement of the flywheel 3 and/or 4 relative to the other flywheel. As described in connection with FIG. 1, this enhances the damping action of the fluid medium in the chamber 130.

As shown in FIG. 4, the retainers 159 have slightly conical extensions 159a which fit into the adjacent end portions of the respective coil springs 145. Each extension 159 has a substantially conical or roof-shaped tip 159b. Such configuration of the extensions 159a and their tips 159b facilitates penetration of the retainers 159 into the adjacent end portions of the respective coil springs 145. It is also possible to replace the slightly conical extensions 159a with substantially spherical extensions. All that counts is to select the configuration of the extensions 159a in such a way that each extension can readily find their way into the adjacent end portion of the respective coil spring 145. The reasons for separation of end portions of coil springs 145 from the respective retainers 159 are numerous. For example, when the apparatus 101 is driven at a very high speed, the coil springs 145 are urged against the member 181 with a pronounced force so that friction between the member 181 and the adjacent convolutions of the coil springs 145 suffices to prevent immediate expansion of these coil springs even if such expansion is permitted by the arms 145 and abutments 155, 155a. At any rate, the expansion of coil springs 145 is not immediate so that the retainers 159 can become completely separated therefrom. An additional reason for potential separation of retainers 159 from the adjacent coil springs 145 is that the viscous fluid medium in the compartment 151 can oppose complete expansion of coil springs 145 or a rapid movement of retainers 159 in order to remain in engagement with the adjacent coil springs.

As shown in FIG. 4 by broken lines at 165a, the abutments 165, 166 can be offset with reference to the webs 150 of the flange 141 in such a way that no compression of coil springs 148 takes place in immediate response to angular displacement of the flywheel 3 and/or 4 from the starting or neutral angular position of FIG. 4. At such time, the apparatus 101 merely produces a hydraulic or viscous damping action and/or a frictional damping action but without any damping as a result of compression of the coil springs.

The extent or magnitude or the characteristic of the hydraulic or viscous damping action can be varied in a number of ways, for example by altering the total number of spring retainers 159 and/or by altering the number of spring retainers in the compartment 151 or in the compartment for the coil springs 148. For example, at least some of the illustrated spring retainers 159 can be omitted to thus weaken the hydraulic damping action. Additional variations of the hydraulic or viscous damping action can be achieved by increasing or reducing the quantity of viscous fluid medium in the chamber 130. Still further, the damping action can be regulated by changing the width of the gap 154 between the flange 141 and surface portion 160 and/or 161.

The damping action which is attributable to agitation of viscous fluid medium in the chamber 130 is brought about in the same way as described above in connection with FIGS. 1 and 2.

FIG. 4 shows that the dampers 13 and 14 respectively comprise four coil springs 145 and 148. Each coil spring 145 extends along an arc of approximately 78° (when the flywheels 3 and 4 assume the neutral positions of FIG. 4). Each of the coil springs 148 which form the group 148b extends along an arc of approximately 74° and each coil spring 148 in the group 148a extends along an arc of at least 68°. In other words, the four outer coil springs 145 jointly extend along an arc of approximately 86% of a complete circle, and the four inner coil springs 148 together extend along an arc which approximates 79% of a complete circle.

FIG. 4 shows that the portion 4b of the flywheel 4 has radially outwardly extending projections or lugs 186 which alternate with recesses or tooth spaces 186a. At least some of the projections 186 have tapped bores or holes 187 for screws or other fasteners which are used to secure the clutch cover 11 (not shown in FIGS. 3 and 4) to the flywheel 4. In addition, at least some of the projections 186 have bores or holes 188 for centering pins which facilitate assembly of the flywheel 4 with the clutch cover corresponding to the cover 11 of FIG. 1. The projections 186 facilitate mounting of the clutch on the flywheel 4. The recesses 186a serve as passages for the circulation of atmospheric air which cools the flywheel 4 at 70 and the adjacent parts of the friction clutch. Such air can flow toward and through the passages 169 which are provided in the flywheel 4 radially inwardly of the friction surface 4a and establish communication between the radially innermost portion of the annular ventilating channel 168 and the surrounding atmosphere. FIG. 4 shows that the passages 169 extend in the circumferential direction of the flywheel 4. FIG. 3 shows that portions of such passages can also extend in the radial direction of the flywheel 4.

The provision of recesses 186a renders it possible to reduce the overall mass of the flywheel 4 if such reduction of the mass and inertia is desired or necessary. In addition, the projections 186 render it possible to increase the mass of the flywheel 4 in the region of the friction surface 70; this reduces the likelihood of overheating of such portion of the flywheel 4.

The apparatus 101 of FIGS. 3, 3a and 4 is operated as follows:

When the flywheel 4 is caused to turn relative to the flywheel 3 so that it leaves the neutral position of FIG. 4, the coupling 142 turns the flange 141 relative to the flywheel 3 whereby the coil springs 148 of the group 148b undergo compression and store energy as a result of engagement with the respective webs 150 of the flange 141 and the corresponding abutments 165, 166 in the grooves 152, 153 of the sections 131 and 132. When the flywheel 4 completes an angle 179 in one direction or an angle 190 in the opposite direction, the webs 150 of the flange 141 begin to compress the coil springs 148 in the windows 147 for the group 148a so that, if the flywheel 4 continues to turn relative to the flywheel 3 (and/or vice versa) the coil springs 148 of the group 148b continue to store energy and the coil springs 148 of the group 148a begin to store energy. When the flywheel 4 completes the angle 179a in one direction or the angle 190a in the opposite direction, the arms 144 of the flange 141 begin to compress the coil springs 145 of the outer damper 13. In other words, if the angular displacement of the flywheel 4 relative to the flywheel 3 continues beyond the angle 179a or 190a, the flange 141 cooperates with the abutments 155, 155a and 165, 166 to simultaneously compress the coil springs 148 of the groups 148a, 148b as well as the coil springs 145. It will be seen that the damper means including the dampers 13, 14 of FIGS. 3 and 4 has a two stage characteristic curve. The angles 179, 190, 179a, 190a can be identical or dissimilar. This enables the designer to provide a composite damper 13, 14 which has a three-stage or a higher-stage characteristic curve in one or both directions. For example, the arrangement can be such that the composite damper will have an at least two-stage characteristic curve in one direction and an at least three-stage characteristic curve in the opposite direction.

The viscous or hydraulic damping action of the fluid medium in the chamber 130 can be altered still further by utilizing sections 131, 132 and/or a flange 141 defining inner and/or outer annular compartments having a non-uniform cross-sectional outline. Thus, the resistance which is offered to the flow of viscous fluid medium in the inner and/or outer compartment can be reduced by increasing the cross-sectional area of one or more portions of the respective compartment. For example and as shown in the left-hand portion of FIG. 4, the compartment 151 can have at least one enlarged portion 189 which is attributable to suitable configuration of the respective rib 149 of the flange 141. Such enlarged portion allows for ready flow of viscous fluid medium along the respective cup-shaped spring retainer 159. The transition from the enlarged portion or portions 189 into the other portion or portions of the compartment 151 can be abrupt or gradual. The enlarged portion or portions 189 can be provided at any selected location as seen in the circumferential direction of the apparatus 1. It is presently preferred to place such enlarged portions 189 adjacent the end convolutions of the coil springs 145. More specifically, the enlarged portion or portions 189 will be adjacent the end portion or portions of one or more coil springs 145 in the undeformed or in the least deformed condition of such coil springs, namely when the flywheels 3 and 4 assume the neutral positions of FIG. 4.

It is further preferred to place the enlarged portion or portions 189 adjacent the innermost portion or portions of the respective coil spring or coil springs 145, i.e., at locations which are remote from the cylindrical member 181. It is not necessary to provide each enlarged portion 189 in the web or webs 149 of the flange 141. For example such enlarged portion or portions can be provided in the section 131, in the section 132 or in each of these sections.

The spring retainers 159 render it possible to regulate the hydraulic or viscous damping action with a high degree of accuracy and in an extremely simple manner. Thus, the retainers 159 can displace predetermined quantities of viscous fluid medium in response to predetermined angular displacements of the flywheels 3 and 4 relative to each other, i.e., the retainers can regulate the damping characteristics in dependency on certain operating parameters (including the extent of angular displacement of the flywheels relative to each other). The provision of the enlarged portion or portions 189 of the compartment 151 and/or of one or more enlarged portions in the compartment for the coil springs 148 of the inner damper also contributes to a regulation of the damping action in dependency on changes in certain parameters.

Figure 5:
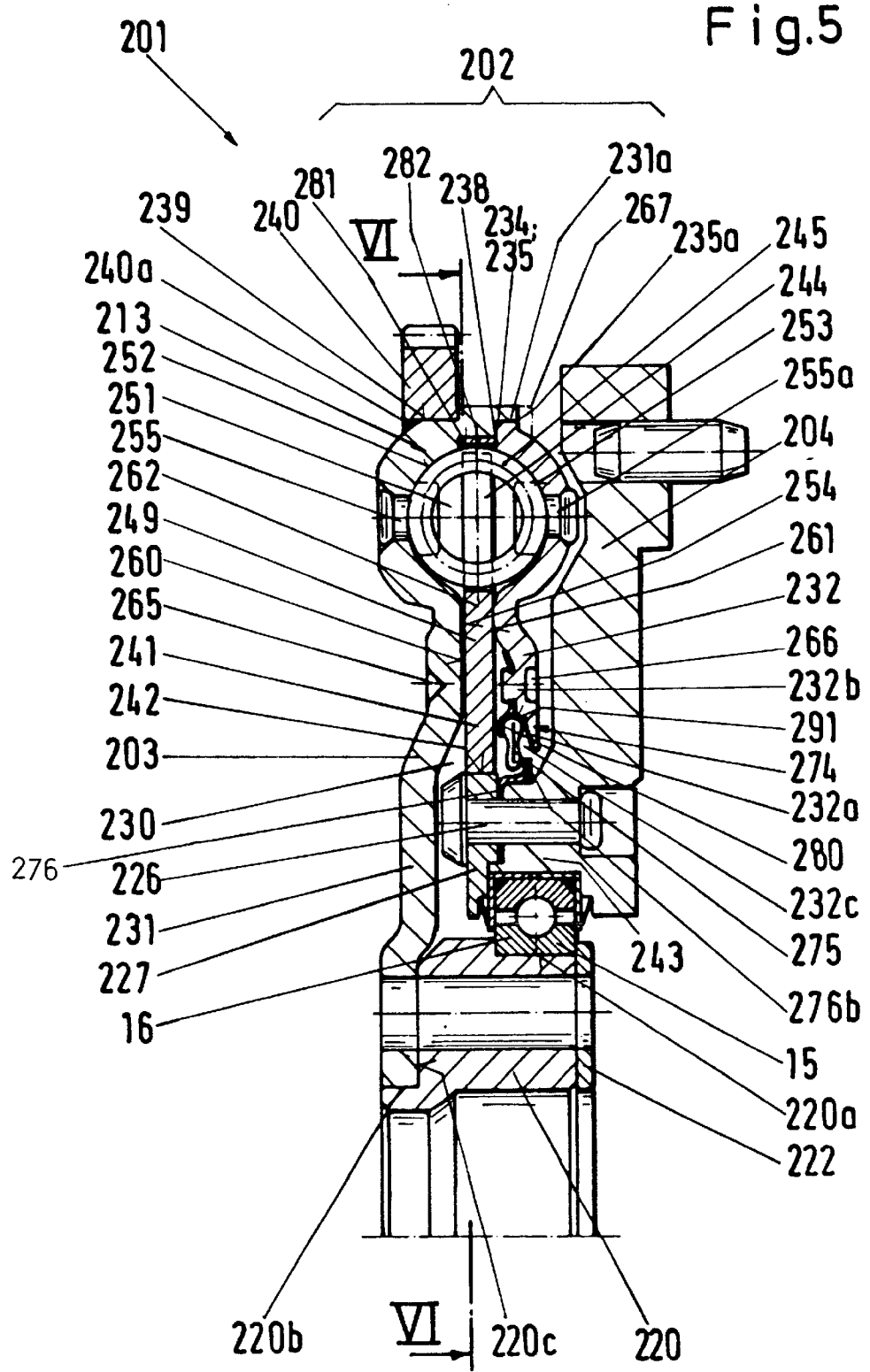
FIG. 5 is a fragmentary axial sectional view of a third torsional vibration damping apparatus.
Figure 6:
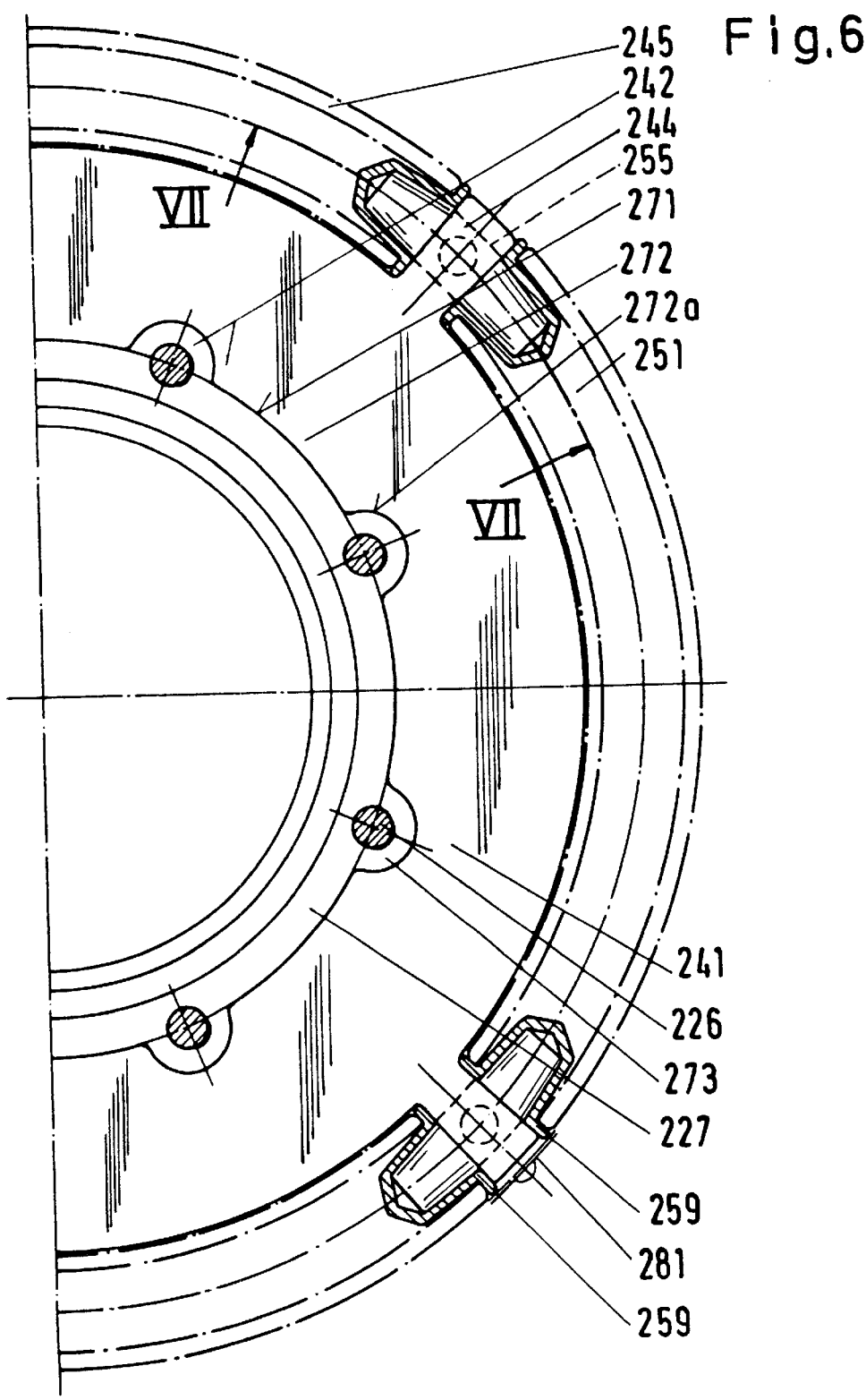
FIG. 6 is a fragmentary sectional view as seen in the direction of arrows from the line VI—VI of FIG. 5.

FIGS. 5 and 6 illustrate a third torsional vibration damping apparatus 201. Nearly all such parts of this apparatus which are identical with or clearly analogous to corresponding parts of the apparatus 1 or 101 are denoted by similar reference characters plus 200 or 100. The apparatus 201 also comprises a composite flywheel 202 having at least two discrete components or flywheels including a first flywheel 203 which can receive torque from the output element of the engine and a flywheel 204 which can transmit torque to the input element of the change-speed transmission of the power train. The bearing unit 15 between the flywheels 203 and 204 comprises an antifriction bearing 16 with a single row of spherical antifriction rolling elements. However, it is also possible to employ two antifriction bearings or an antifriction bearing with two or more rows of spherical, roller-shaped, needle-shaped or otherwise configurated rolling elements. The flywheel 203 includes two annular sections 231, 232 which define an annular chamber 230 for a single damper 213. The sections 231, 232 are connected to each other radially outwardly of the chamber 230, and each such section can constitute a suitably deformed blank of sheet metal. The seal 238 between the sections 231, 232 is a circumferentially complete welded seam which is provided between two radially extending surfaces 234, 235 of the sections 231, 232 and replaces an O-ring or any other sealing element which is normally used in the absence of a welded connection between the sections. The welding operation is preferably carried out in a resistance butt welding machine or in a capacitor discharge welding machine, namely a machine wherein the sections 131, 132 are welded to each other (at 138) in response to the application of a high-amperage low-voltage alternating current. Such application of electrical energy entails a heating of sections 131, 132 along their surface portions 134, 135, and the final welding step is carried out in response to the application of axial pressure. The area of surface portions 234, 235 is related to the strength of the applied current.

In order to properly position the sections 231, 232 relative to each other in the radial direction of the flywheel 203 preparatory to and during welding at 238, the section 231 is provided with a ring-shaped axial extension or portion 231a which surrounds and centers the cylindrical peripheral surface 235a of the section 232. In order to ensure accurate angular positioning of the sections 231, 232 relative to each other during welding, the outer surfaces of the sections 231, 232 are respectively provided with recesses or sockets 265, 266 for the tips of prongs of welding equipment which is used to bond the sections 231, 232 to each other at 238.

As mentioned above, welding of the sections 231, 232 to each other at 238 involves the application of pressure in the axial direction of such sections. Since the material of the sections is soft at 234, 235 as a result of the application of electrical energy, the sections 231, 232 would be likely to move axially beyond the optimum positions relative to each other, i.e., the width of the chamber 230 (as seen in the axial direction of the flywheel 203) could be reduced beyond the optimum value so that the coil springs 245 of the damper 213 would be likely to jam. Therefore, the section 232 is preferably provided with one or more axial stops 267 (one shown by phantom lines in the upper portion of FIG. 5) which come into abutment with the adjacent end face of the cylindrical portion 231a of the section 231 when the welding operation takes place and the portions of sections 231, 232 are soft in the regions of the surface portions 234, 235. The stops 267 ensure that the dimensions of the compartment 251 constituting the outermost portion of the chamber 230 are such that the coil springs 245 are received therein with minimal clearance which is desirable to avoid buckling of the coil springs 245 in the axial direction of the flywheels 203 or 204 and/or to ensure proper guidance of the coil springs in the circumferential direction of the chamber 230.

Another advantage of the stop or stops 267 is that the strength of the current which is applied to the sections 231, 232 need not be regulated with a high degree of accuracy because the application of relatively strong current and the resulting softening of sections 231, 232 at 238 will not result in excessive narrowing of the chamber 230. This renders it possible to avoid an extremely accurate conformance of the areas of surface portions 234, 235 to the selected strength of the applied current.

The output member of the damper 213 is radially extending flange 241 which is disposed between the sections 231, 232 of the housing for the chamber 230. The radially innermost portion of the flange 241 has a central opening 271 surrounded by an annulus of tooth-like projections constituting one-half of a torque-transmitting connection or coupling 242. The other half of such coupling is defined by tooth-like projections 273 at the periphery of the disc 227 which is secured to the end face of the extension 243 of the flywheel 204 by rivets 226. The radially outermost portion of the flange 241 is constituted by the arms 244 which alternate with the coil springs 245 of the damper 213 in the compartment 251 of the chamber 230.

The compartment 251 is defined in part by circumferentially extending arcuate grooves 252, 253 in the internal surfaces of the sections 231, 232. The grooves 252, 253 can be formed during conversion of sheet metal blanks into the respective sections 231 and 232. These grooves respectively receive those portions of the coil springs 245 which extend axially of the apparatus 201 beyond the respective sides of the flange 241. The flange 241 comprises a ring-shaped portion 249 corresponding to the ribs 49 of the apparatus 1 and defining with the sections 231, 232 a relatively narrow clearance or gap 254 connecting the compartment 251 with the radially innermost portion of the chamber 230.

The configuration of surfaces bounding the grooves 252, 253 of the sections 231, 232 is preferably such that these surfaces closely conform to the outlines of the adjacent coil springs 245. In other words, the convolutions of the coil springs 245 can slide along and can be guided by the surfaces which bound the grooves 252 and 253. Such guidance is desirable and normally takes place at least while the apparatus 201 rotates, namely when the coil springs 245 are acted upon by centrifugal force.

The grooves 252, 253 respectively contain abutments or stops 255, 255a for the adjacent end portions of coil springs 245 in the compartment 251. FIG. 6 shows that the length of the abutments 255, 255a in the circumferential direction of the flywheel 203 equals the length or width of the arms 244 on the flange 241. FIG. 6 further shows that the apparatus 201 comprises cup-shaped spring retainers 259 which are interposed between the arms 244 of the flange 241 and the adjacent end portions of the coil springs 245. The configuration of the retainers 259 is preferably selected in such a way that their peripheral surfaces are immediately or closely adjacent the surfaces bounding the grooves 252, 253. This enables the retainers 259 to act not unlike plungers or pistons for the supply of fluid medium in the compartment 251.

The aforementioned clearance or gap 254 is defined in part by the ring-shaped portion 249 of the flange 241 and in part by the section 231 and/or 232 of the flywheel 203. The internal surfaces of the sections 231, 232 respectively comprise circumferentially complete portions 260, 261 which together define a ring-shaped passage or channel 262 for reception of the portion 249 of the flange 241. The gap 254 constitutes that portion of the passage or channel 262 which is not occupied by the portion 249 of the flange 241. Such gap can be provided only between the portion 249 and the surface portion 260, only between the portion 249 and the surface portion 261 or in part between the portion 249 and surface portion 260 and in part between the portion 249 and the surface portion 261. The width of the passage or channel 262 exceeds only slightly the thickness of the flange 241 so that the gap 254 is relatively narrow.

The damper 213 comprises four coil springs 245 each of which extends along an arc of approximately 82° when the flywheels 203 and 204 assume the neutral positions of FIG. 6. In other words, the combined length of the four coil springs 245 equals or approximates 90% of a complete circle.

In order to reduce the likelihood of, or to prevent, the development of internal stresses in the coil springs 245, these coil springs can be pre-curved or prefabricated prior to their introduction into the compartment 251. The curvature of coil springs 245 prior to insertion into the compartment 251 can equal or can merely approximate the curvature of the grooves 252 and 253. Such pre-curving or prefabrication of the coil springs 245 facilitates and simplifies the assembly of the damper 213 with the sections 231, 232 of the flywheel 203.

When the apparatus 201 is driven, the supply of viscous fluid medium in the chamber 230 fills at least the annular compartment 251, i.e., the radially outermost portion of the chamber 230.

FIG. 6 shows the central opening 271 of the flange 241 and the annulus of tooth-like projections 272 which surround the opening 271 and constitutes one-half of the coupling or connection 242. The recesses 272a between the projections 272 of the flange 241 constitute tooth spaces for the complementary projections or teeth 273 at the periphery of the disc 227. As mentioned above, the projections 273 constitute the other half of the connection or coupling 242. The shanks of the rivets 226 which connect the disc 227 to the extension 243 of the flywheel 204 extend through the projections 273 of the disc 227.

The coupling 242 allows for such installation of the flange 241 between the sections 231, 232 that the width of the gap 254 is sufficiently small to ensure that the parts which define this gap constitute an effective flow restrictor for the viscous fluid medium which tends to flow from or back into the compartment 251 of the chamber 230. Another advantage of the coupling 242 is that it allows for the making of parts around the gap 254 with relatively large tolerances. Such parts include the disc 227, the flange 241 and the sections 231, 232 of the flywheel 203.

The radially innermost portion of the chamber 230 is sealed from the surrounding atmosphere (and more particularly from the ventilating channel between the section 232 and the flywheel 204) by a sealing device 274 which operates between the radially innermost portion of the section 232 and the flywheel 204. The sealing device 274 distinguishes from the sealing device 174 of FIG. 3a in that the entire sealing member 275 is coated with a layer or film of elastically or plastically deformable material having a low coefficient of friction. Such material can be a plastic substance which is sprayed onto the sealing member 275. Alternatively, the member 275 can be dipped into a body of liquid plastic material which hardens on the sealing member 275 to form an elastic coat. The sealing member 275 is elastically deformable in the axial direction and its inner marginal portion bears against the outer marginal portion 276b of a second sealing member or insert 276 the inner marginal portion of which is clamped between the disc 227 and the extension 243 of the flywheel 204. The outer marginal portion of the sealing member 275 is tiltably held between the radially innermost portion 232a of the section 232 and a ring-shaped carrier 280 which is secured to the inner side of the section 232 by rivets 232b or other suitable fasteners.

The radially innermost portion 232a of the section 232 extends radially inwardly beyond the outer marginal portion of the sealing member 275 and defines with the latter an annular space 232c which is disposed radially outwardly of the locus of abutment of the inner marginal portion of the sealing member 275 with the outer marginal portion 276b of the sealing member 276. This ensures that any viscous fluid medium which happens to leak between the sealing members 275, 276 in the region of the outer marginal portion 276b enters the space 232c under the action of centrifugal force and can be forced back into the chamber 230, again under the action of centrifugal force, when the flywheel 203 is driven at a high speed so that the fluid medium which accumulates in the space 232c is compelled to creep around the outer marginal portion of the sealing member 275 and back into the chamber 230. The outer marginal portion of the sealing member 275 is received in a circumferentially complete notch 291 in the radially innermost portion 232a of the section 232. Such notch is bounded at the left-hand side (as seen in FIG. 5) by the radially innermost portion of the carrier 280 which is preferably elastic and bears against the outer marginal portion of the sealing member 275 so that the latter is held in a predetermined axial position relative to the flywheel 203 but can be tilted in its socket so as to assume the shape of a conical frustum as a result of engagement with the outer marginal portion 276b of the sealing member 276. The outer marginal portion 276b is dished to increase its strength and hence its ability to withstand deforming forces when it is engaged by the stressed sealing member 275.

The section 231 of the flywheel 203 is nearer to the engine than the section 232 and is connected with an axial protuberance 220 which constitutes a third component part of the flywheel 203. The protuberance 220 is surrounded by the antifriction bearing 16 of the bearing unit 15 which operates between the flywheels 203 and 204. The manner of mounting the bearing 16 between the projection 243 and the protuberance 220 is the same as or similar to that described in connection with FIG. 1. The section 231 has a cylindrical centering surface 220b for the complementary cylindrical internal surface of the section 231, and the protuberance 220 is further provided with a shoulder 220c serving as an abutment and axial stop for the section 231 with reference to the section or protuberance 220. The bolts (not specifically shown) which secure the section 231 to the protuberance 220 can also serve as a means for securing the ring-shaped retainer 222 which abuts the end face of the protuberance 220 and overlies the radially innermost portion of the inner race of the bearing 16 in order to fix the bearing 16 in a predetermined axial position with reference to the flywheel 203. The bearing 16 is held in a predetermined axial position with reference to the flywheel 204 by a thermal barrier corresponding to the thermal barrier 25 of the apparatus 1 in cooperation with an internal shoulder of the projection 243 and the radially innermost portion of the disc 227. The aforementioned bolts which are used to connect the section 231 to the protuberance 220 can be replaced by rivets, screws or other suitable fasteners. It is also possible to weld the protuberance 220 to the section 231 or to upset the leftmost portion of the protuberance 220 (as seen in FIG. 5) around the radially innermost portion of the section 231.

The apparatus of FIGS. 5 and 6 is assembled in a manner which is similar to or identical with the manner of assembling the apparatus 1 of FIGS. 1 and 2. In other words, the antifriction bearing 16 is first installed in the flywheel 204 and the sealing member 275 is first installed in the flywheel 203. When the inner race of the bearing 16 is slipped onto the cylindrical seat 220a of the protuberance 20, the coupling 242 becomes operative because the projections 273 at the periphery of the disc 227 enter the tooth spaces 272a between the projections 272 surrounding the central opening 271 of the flange 241. The sealing member 275 is deformed to assume a frustoconical shape and stores energy in automatic response to shifting of the flywheel 204 to the axial position of FIG. 5 because the outer marginal portion 276b of the sealing member 276 is then engaged by the inner marginal portion of the sealing member 275. The assembly of the flywheels 203 and 204 is completed when the ring-shaped retainer 222 is properly affixed to the end face of the protuberance 220. If desired, the retainer 222 can be affixed to the protuberance 220 by a set of rivets, screws or other suitable fasteners, i.e., not necessarily those fasteners which are used to connect the section 231 to the protuberance 220.

The hydraulic or viscous damping action is brought about as a result of turbulence in and displacement of fluid medium in the annular compartment 251 of the chamber 230. The fluid medium produces the damping action in the same way as described above in connection with the apparatus 1 and 101.

In order to prevent overheating of parts which must move relative to the sections 231, 232, the welding of sections 231, 232 to each other at 238 is preferably preceded by the application of coats of electrically insulating material to certain parts of the sections 231, 232 and/or to other parts which are adjacent thereto and must be confined in the chamber 230 prior to start of the actual welding operation. Such parts include the flange 241 and the spring retainers 259. The provision of coats of insulating material is desirable on the additional ground that excessive heating of parts which are adjacent the sections 231, 232 in the course of the welding operation could result in an undesirable change of the characteristics of the material of such parts. The coil springs 245 also include those parts which are likely to be affected by excessive heat during welding of the sections 231, 232 to each other. The parts 231, 232, 245, 259, 241, 255, 255a can be coated entirely or in part. Phosphating constitutes one of the presently preferred modes of providing selected parts with coats of electrically insulating material. Another possibility is to make certain parts, such as the spring retainers 259 and the abutments 250, 255a, of a non-conductive material. In accordance with a presently preferred embodiment, the sheet-metal sections 231, 232 are phosphated, the same as the flange 241. On the other hand, the coil springs 245 are preferably coated with a lacquer. However it is also possible to phosphatize the springs 245. Another mode of providing selected portions of certain parts of the flywheel 203 with electrically insulating layers is to apply to such parts coats of a ceramic or synthetic plastic material or with layers of grease. Ceramic and/or plastic coats or coats of grease can be applied particularly to the sections 231, 232. The sections 231, 232 can be coated except in the regions (surfaces 234, 235) where they are to be welded to each other as well as in the regions where they are to be temporarily connected to the source of electrical energy. Such regions can include the surfaces bounding the recesses or sockets 265 and 266. Alternatively, it is possible to coat the entire section 231 and/or 232 and to thereupon remove the applied coat of electrically insulating material in the region where the section is to be bonded to the other section and in the region where the section is to be connected to the source of electrical energy. Such removal of electrically insulating material can involve a treatment in a grinding machine or another machine tool. The insulating material must be selected in such a way that it is compatible with the viscous fluid medium in the chamber 230.

The making of phosphate layers is one of the presently preferred modes of applying insulating coats to sections 231, 232 and/or to other parts because a phosphate layer exhibits highly desirable wear-resistant and self-lubricating properties.

The periphery of the section 231 is provided with a cylindrical seat 239 for a ring-shaped starter gear 240 which abuts a peripheral shoulder of the section 231 and is preferably welded (at 240a) to the section 231. The connection at 240a can constitute a series of spot welds, a plurality of arcuate welded seams or a continuous circumferentially complete welded seam. The application of spot welded or other seams is desirable because the thickness of the section 231 is normally less than the thickness of the starter gear 240 so that an annular clearance is provided along the internal surface of the gear 240 and such clearance can receive the connection 240a.

The thickness of one of the sections 231, 232 can exceed the thickness of the other section. As shown in FIG. 5, the thickness of the section 231 exceeds the thickness of the section 232.

As in the embodiment of FIG. 3, in order to reduce wear between the convolutions of the coil spring 245 and the radially outer adjacent surfaces of groove 252, the flywheel 3 is preferably provided with a short cylindrical member 281 of high wear-resistant material which is installed in a shallow recess 282 forming the outermost portion of the annular compartment 251. When the apparatus 201 is driven, the coil springs 245 are acted upon by centrifugal force and their convolutions bear against the cylindrical internal surface of the member 281. If desired, the member 281 can be provided with a concave internal surface so as to further increase the area of contact between the member 281 and the coil springs 245.

An advantage of the flywheel 203 is that its sections 231, 232 can be produced at a low cost. This is due to the fact that the grooves 252, 253, the recesses 265, 266, the recess 282, the centering portion 231a, the stop or stops 267, the notch 291 and certain other parts of these sections are or can be formed during conversion of the respective metallic blanks in a stamping, forging or like machine. This holds true even if the grooves 252, 253 are not circumferentially complete depressions in the sections 231, 232.

Figure 7:
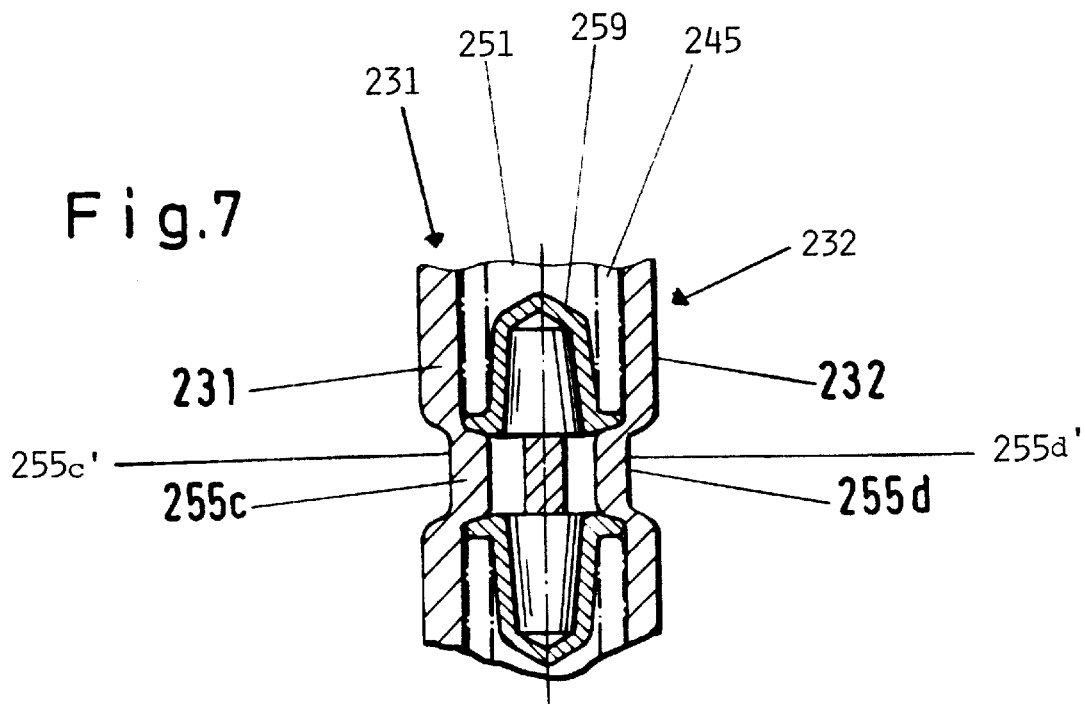
FIG. 7 is a fragmentary sectional view, substantially as seen in the direction of arrows from the line VII—VII of FIG. 6, but showing a slightly modified housing for the fluid-containing chamber.

FIG. 7 shows that the sections 231, 232 can be provided with integral pocket-like abutments or stops 255c, 255d which replace separately produced abutments and constitute stops for the adjacent cup-shaped spring retainers 259. Such pocket-like abutments can be readily formed on sections which are made of sheet metal.

An additional advantage of integral pocket-like abutments is that their making necessarily results in the making of sockets or recesses 255c', 255d' and such recesses can replace the recesses 265, 266 of FIG. 5. In other words, these recesses can serve to receive the tips of prongs forming part of the welding equipment which is used to bond the sections 231, 232 of FIG. 7 to each other. The abutments 255c, 255d thus constitute electrodes by means of which electrical energy is applied to the sections 231, 232 for bonding them to each other. In addition, the prongs which enter the recesses 255c', 255d' serve as means for applying the required axial pressure during bonding. The mutual spacing of prongs which enter the recesses 255c', 255d' is selected in such a way that the welded-together sections 231, 232 are maintained at an optimum axial distance from each other. This obviates the need for the axial stop or stops 267 of FIG. 5. Proper axial spacing of the sections 231, 232 is desirable and advantageous in order to ensure that the coil springs 245 in the compartment 251 of the chamber between the sections 231, 232 are not held against movement in the circumferential direction of the flywheel. Additionally, proper axial positioning of the sections 231, 232 ensures the establishment of a relatively narrow gap (see the gap 254 in FIG. 5) so as to ensure that the viscous fluid medium in the chamber including the compartment 251 will encounter requisite resistance to the flow through the gap.

Figure 8:
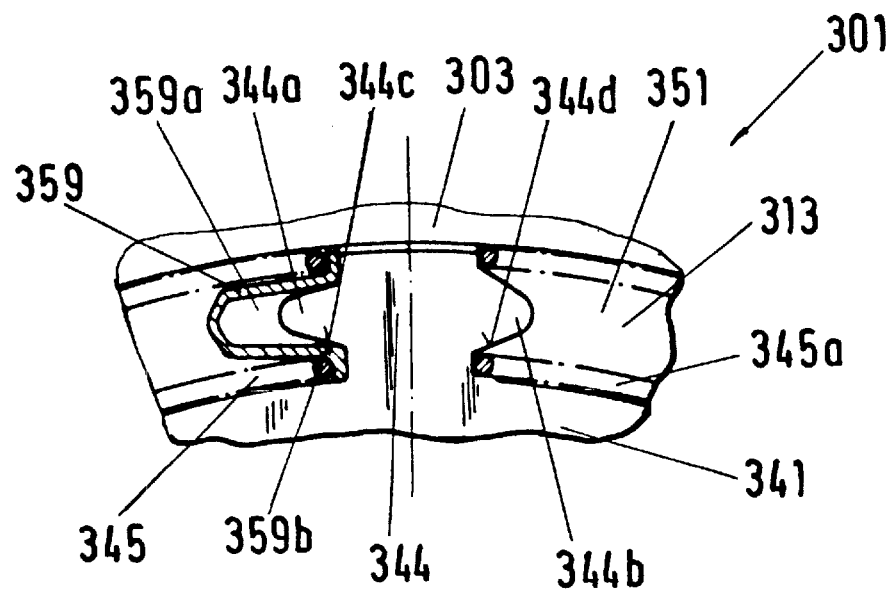
FIG. 8 is a fragmentary sectional view of a further torsional vibration damping apparatus.

FIG. 8 shows a portion of a further apparatus 301 which has a flange 341 with radially outwardly extending projections or arms 344 between the neighboring coil springs 345 and 345a. The coil springs 345 and 345a are installed in a circumferentially complete annular compartment 351 forming part of a chamber for a supply of viscous fluid medium. The chamber is defined by two sections of a flywheel 303. The coil spring 345a is acted upon directly by the adjacent portion of the arm 344. On the other hand, the coil spring 345 is acted upon by a cup-shaped spring retainer 359 which is slipped onto a projection or lobe 344a of the arm 344. Another projection or lobe 344b of the illustrated arm 344 extends into the adjacent end portion of the coil spring 345a. The coil springs 345, 345a and the arms 344 of the flange 341 together constitute a damper 313 which is installed in the compartment 351.

The cup-shaped spring retainer 359 has a socket 359a which receives the lobe 344a. The configuration of the lobe 344a and of the cup-shaped retainer 359 are preferably such that the coil spring 345 is held out of contact with the surface bounding the radially outermost portion of the annular compartment 351. To this end, the lobe 344a has a sloping ramp-like cam face 344c which engages the adjacent portion of the internal surface of the retainer 359 in such a way that the radially outermost portions of adjacent convolutions of the coil spring 345 are held out of contact with the surface bounding the radially outermost portion of the compartment 351. The cam face 344c abuts a complementary portion 359b of the internal surface of the retainer 359. When the lobe 344a is properly received in the socket 359a of the retainer 359 so that it bears against the portion 359b of the internal surface of the retainer, at least one or more end convolutions of the spring 345 are out of contact with the surface surrounding the radially outermost portion of the compartment 351.

The projection or lobe 344b of the arm 344 which is shown in FIG. 8 has a sloping ramp-like cam face 344d serving to act upon the adjacent convolution or convolutions of the coil springs 345a in order to pull such convolution or convolutions radially inwardly and away from contact with the surface bounding the radially outermost portion of the annular compartment 351.

The configurations of the lobe 344a and of the internal surface of the retainer 359 (namely of the surface which bounds the socket 359a) are preferably such that the lobe 344a can properly pull the adjacent end portion of the coil spring 345 radially inwardly and away from the surface bounding the outermost portion of the compartment 351, regardless of the angular position of the retainer 359 relative to the arm 344. Such change in the angular position of the retainer 359 can take place while the damper 313 is in actual use.

It goes without saying that projections or lobes corresponding to the lobes 344a and 344b can also be provided on the arms 44, 144 or 244 of flanges in the previously described torsional vibration damping apparatus. Such lobes ensure that the coil springs 345 and 345a can move relative to the sections of the flywheel 303 even if the apparatus 301 is driven at a high speed so that the coil springs 345 and 345a are subjected to the action of substantial centrifugal forces which tend to maintain their convolutions in strong frictional engagement with the surfaces bounding the compartment 351. In other words, at least one or more end convolutions of each of the coil springs 345, 345a are held out of contact, or out of pronounced contact, with the adjacent portions of the surfaces bounding the compartment 351. This allows for a much more predictable operation of the damper 313.

The lobes 344a, 344b further ensure that at least the end portions of the coil springs 345, 345a retain some elasticity, even if the apparatus 301 is driven at a very high speed at which the centrifugal force acting upon the coil springs 345, 345a suffices to maintain the majority of convolutions of these springs in strong frictional engagement with the adjacent portions of the surfaces bounding the compartment 351 so that such convolutions cannot move in the compartment 351 in the circumferential direction of the flywheel 303. The freedom of movement of at least some convolutions of the coil springs 345, 345a relative to the sections of the flywheel 303 is desirable and necessary because the coil springs can damp small-amplitude vibrations which develop as a result of minute angular displacement of the flywheels relative to each other at elevated RPM of the flywheel 3. Such small-amplitude vibrations normally take place at a high frequency.

The blind bore or hole which constitutes the socket 359a of the spring retainer 359 is preferably configurated to have a circular cross-sectional outline. This can be achieved by deforming a metallic or plastic blank in a stamping or like machine and/or by subjecting the thus obtained blank to one or more secondary treatments, such as embossing, die stamping or the like.

Though FIG. 8 merely shows two coil springs 345, 345a of an outer damper, the webs (note the webs 50 in FIG. 2) can also comprise projections or lobes (corresponding to the lobes 344a, 344b) if the apparatus 301 includes a second damper radially inwardly of the damper 313. This ensures that the end portions of coil springs forming part of the inner damper are held out of contact with the adjacent rib or ribs of the flange 341. The coil springs of the inner damper can bear directly against the webs of the flange 341 or against retainers corresponding to the retainer 359 of FIG. 8.

Figure 9:
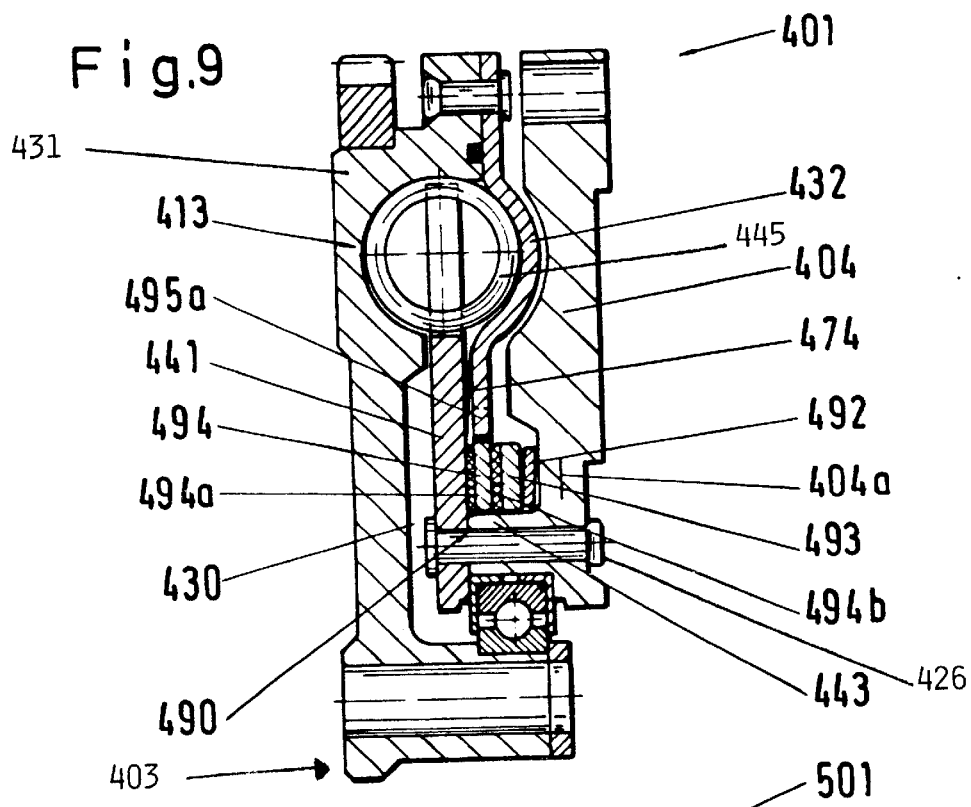
FIG. 9 is a fragmentary axial sectional view of an additional torsional vibration damping apparatus.

Referring to FIG. 9, there is shown a portion of a further apparatus 401 having a flywheel 403 and a flywheel 404. The flywheel 403 has two sections 431, 432 which define an annular chamber 430 for a damper 413. The chamber 430 is at least partially filled with a supply of fluid medium which is preferably a highly viscous substance and can fill the chamber 430 entirely or in part. The damper 413 comprises an output member in the form of a flange 441 which is mounted directly on the axial extension or projection 443 of the flywheel 404. The arrangement is such that the rivets 426 establish a fluidtight seal between the innermost portion of the flange 441 and the end face of the projection 443.

A sealing device 474 is installed between the flange 441 and the flywheel 404 radially outwardly of the projection 443. The apparatus 401 further comprises a friction generating device 490 in the form of a slip clutch which is disposed between the flange 441 and the flywheel 404 in the region 404a radially outwardly of the projection 443. The slip clutch 490 is a dry clutch and, therefore, it is out of contact with the fluid medium which is confined in the chamber 430. In the embodiment of FIG. 9, the slip clutch 490 comprises a friction disc 494 and friction rings or pads 494a, 494b which flank the disc 494. The friction pad 494a is installed axially between the disc 494 and the flange 441. A biasing device 493 in the form of a washer is disposed at that side of the friction pad 494b which faces away from the disc 494, and the biasing device 493 is acted upon by a diaphragm spring 492 which reacts against the flywheel 404 in the region 404a. The diaphragm spring 492 ensures that the friction pad 494a is compressed between the flange 441 and the disc 494 as well as that the friction pad 494b is compressed between the disc 494 and the biasing device 493. The friction disc 494 has radially outwardly extending tooth-like projections in mesh with complementary inwardly extending projections or prongs 495a of the section 432 of the flywheel 403. The projections of the disc 494 can mate with the projections 495a with some play or without any play, depending upon whether it is desired that the slip clutch 490 be effective immediately or only after a certain angular displacement of the flywheels 403 and 404 relative to each other.

The improved apparatus can be provided with one or more friction generating devices which are effective during each and every stage of angular movement of the flywheels 403 and 404 relative to each other or only during certain stages of such angular movement. The disc-shaped members 493, 494 can cooperate with the diaphragm spring 492 as well as with one or more springs which operate in the circumferential direction of the flywheels 403 and 404 in such a way that torque which is applied to the disc or discs 493, 494 suffices, at least during certain stages of compression of such circumferentially acting spring or springs, to overcome the moment of friction of the disc or discs and to thus reset the disc or discs to its or their normal or neutral position.

It is often desirable to install the friction generating device in such a way that it exhibits a certain amount of play in the circumferential direction. In other words, there is a certain amount of play between one or more abutments on the friction disc or discs and the cooperating complementary abutments. This ensures that the friction generating device becomes effective with a selected delay following the start of compression of coil springs which form part of the damper or dampers.

The useful life of the friction generating device or devices can be prolonged and the operation of such device or devices remains unchanged if the device or devices are mounted in the fluid-containing chamber of the flywheel 403. Of course, if the friction generating device or devices are of the type wherein the surfaces between the cooperating components must remain dry, these friction generating devices must be installed outside of the chamber, i.e., in such a way that they cannot be contacted by the viscous fluid medium.

A friction generating device can be connected in parallel with the damper or dampers. However, certain applications of the improved apparatus may render it necessary or desirable to employ one or more friction generating devices which are designed to operate in series with the coil springs of the damper or dampers. The arrangement may be such that the damping action of the friction generating device or devices varies in response to angular displacement of the one and/or the other flywheel from its neutral position, preferably in such a way that the damping action increases as the flywheel 403 and/or 404 continues to turn further away from its neutral position.

The operation can be improved and the construction of the apparatus can be simplified if the friction generating device or devices are designed in such a way that a friction generating device which cooperates with the outer damper produces a damping action which is much more pronounced than the damping action of a friction generating device which cooperates with the inner damper. This also holds true, at least in many instances, for the hydraulic or viscous damping action of the outer and inner dampers. For example, the end portions of coil springs (445) forming part of the outer damper can be engaged by spring retainers corresponding to the retainers 159 or 359 but no such retainers will be provided for the end portions of some or all coil springs which form part of the inner damper. This enables the outer damper to produce a more satisfactory hydraulic or viscous damping action. Alternatively, and if the coil springs of the inner damper form two or more groups, only the coil springs of one of these groups are provided with spring retainers. The coil springs of the other group or groups are not engaged by retainers so that their compression does not entail the displacement of large quantities of fluid medium and the corresponding stage of operation of the inner damper produces a less pronounced hydraulic or viscous damping action. The damping action of the inner and outer dampers is further regulatable by appropriate selection of the quantity of viscous fluid medium in the chamber of the respective flywheel. The compartment for the outer damper is preferably filled with fluid medium so that the viscous damping action begins immediately as soon as the one and/or the other flywheel leaves its neutral position. The viscous damping action of the fluid medium in the compartment for the coil springs of the inner damper is or can be much less pronounced if the compartment for such springs is not entirely filled with viscous fluid medium.

Figure 10:
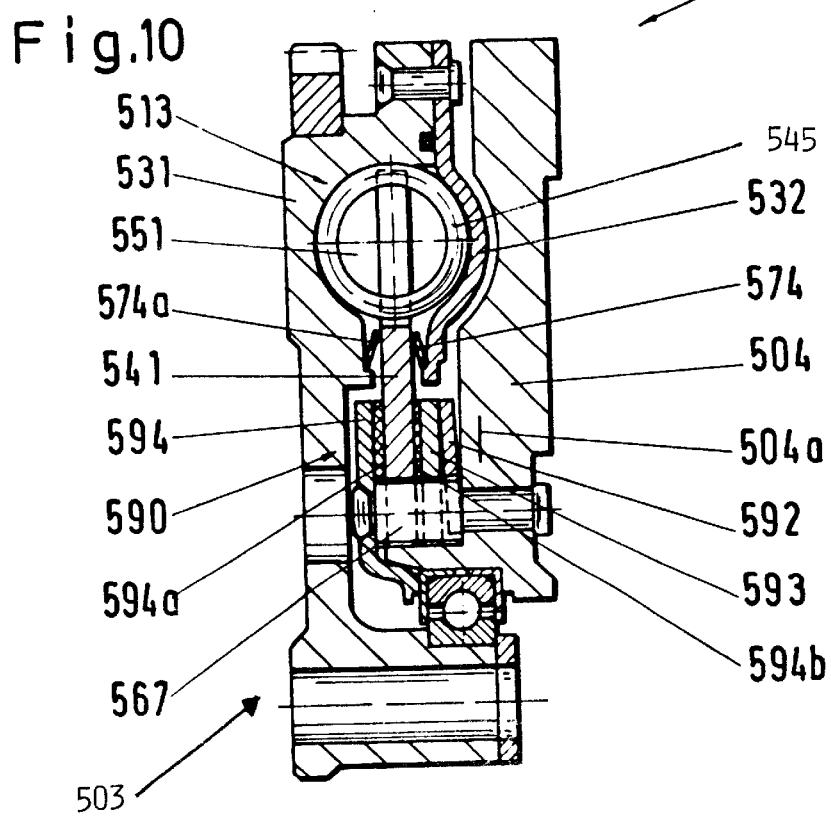
FIG. 10 is a similar fragmentary axial sectional view of still another torsional vibration damping apparatus.

Referring to FIG. 10, there is shown a further apparatus 501 which comprises a damper 513 in the annular compartment 551 of an annular chamber between the sections 531, 532 of a first flywheel 503 cooperating with a second flywheel 504. A first sealing device 574 is interposed between the radially innermost portion of the section 532 and the adjacent portion of a flange 541 which constitutes the output member of the damper 513. A second sealing device 574a is installed between the section 531 and the respective side of the flange 541. The sealing devices 574, 574a cooperate with the flange 541 and with the sections 531, 532 to seal the radially innermost portion of the compartment 551 (i.e., of the annular chamber between the sections 531, 532) from a force-locking or slip clutch 590 which is disposed radially inwardly of the section 532. The inner portion of the flange 541 is flanked by two friction pads 594a and 594b which are flanked by discs 594 and 593. The disc 594 is secured to the flywheel 504 by distancing elements 567 in the form of rivets. The disc 593 is acted upon by a diaphragm spring 592 which reacts against the portion 504a of the flywheel 504. The inner marginal portions of the diaphragm spring 592 and disc 593 are provided with cutouts for the shanks of distancing elements 567 so that the distancing elements 567 hold the diaphragm spring 592 and the disc 593 against angular movement relative to the flywheel 504.

The diaphragm spring 592 is installed in prestressed condition, and the magnitude of such initial stress determines the torque at which the flange 541 can turn relative to the flywheel 504. As mentioned before, the component parts 592–594b cooperate with the radially innermost portion of the flange 541 to establish a force-locking or slip clutch 590.

In order to limit the extent of angular movability of the flange 541 relative to the flywheel 504, this flange can be.provided with radially inwardly extending projections which alternate with the distancing elements 567 in the circumferential direction of the flywheels 503 and 504. When the inwardly extending projections of the flange 541 engage the distancing elements 567, the flange is arrested in one or the other end position relative to the flywheel 504. However, it is equally possible to omit such radially inwardly extending projections of the flange 541 in order to avoid the provision of any means which would limit angular movements of the flange 541 relative to the flywheel 504. The slip clutch 590 is then designed in such a way that the torque which can be transmitted thereby exceeds the nominal torque which can be transmitted by the engine driving the flywheel 503.

In accordance with a non-illustrated modification of the apparatus 501 of FIG. 10, the flange 541 is mounted for limited angular movement relative to the flywheel 504, and additional energy storing elements in the form of coil springs are installed between the discs 593, 594 on the one hand and the flange 541 on the other hand. Such coil springs are received in suitable windows of the discs 593, 594 and flange 541. The windows can be disposed between neighboring distancing elements 567, as seen in the circumferential direction of the flywheels 503 and 504. It is then desirable to employ additional coil springs having a spring characteristic which is much higher than that of the coil springs 545 forming part of the damper 513. The frictional damping action of the slip clutch 519 should substantially exceed frictional damping action which develops in the region of the damper 513. This damping action is generated primarily by the sealing devices 574 and 574a which rub against the flange 541 when the flange performs an angular movement relative to the sections 531, 532 and/or vice versa.

In each of the illustrated embodiments, one can achieve a multi-stage spring characteristic between the corresponding components of the flywheel 3, 103, 203, 303, 403 or 503 in that at least some coil springs of one group of springs or one damper are shorter than the angular spacing between the parts which cooperate with the coil springs to cause the springs to store energy. Moreover, the utilization of such coil springs which are shorter than the recesses or windows for their reception renders it possible to provide a certain range of angular movements of the flywheels relative to each other which does not entail a resetting or restoring of coil springs to their initial positions. For example, and referring to FIGS. 5 and 6, this can be achieved in that the length of the coil springs 245 in the circumferential direction of the flywheels 203 and 204 is less than the distance between the arms 244 and the respective abutments 255, 255a.

Additional embodiments of the improved apparatus can include further combinations of certain parts of the illustrated apparatus. Still further, it is possible to select the materials for various component parts of the apparatus from a wide variety of substances, depending on the intended use, size and/or other characteristics of the torsional vibration damping apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for damping vibrations between an engine and a clutch in a power train, comprising a first flywheel connectable with an output element of the engine; a second flywheel having a friction surface engageable with a clutch plate of the clutch, said first flywheel comprising sections defining a chamber including a radially outer portion which constitutes an annular compartment for a supply of viscous medium which at least partially fills said compartment, said flywheels being rotatable relative to each other in clockwise and counterclockwise directions; and a damper device movably connecting said flywheels to each other and including energy storing elements disposed in said compartment and arranged to store energy in response to rotation of said flywheels relative to each other in either of said directions, at least one of said sections of said first flywheel including a portion disposed radially outwardly of said energy storing elements and extending substantially axially of said first flywheel, said energy storing elements bearing against said portion of said at least one section under the action of centrifugal force in response to rotation of said first flywheel, one of said sections of said first flywheel further comprising a substantially disc-shaped part having a radially inner portion connectable with the output element of the engine and said damper device further comprising a substantially disc-shaped member arranged to transmit torque between said flywheels and having portions extending into said compartment and engaging said energy storing elements.

2. The apparatus of claim 1, wherein said energy storing elements have end portions and said damper device further comprises abutments provided in said compartment adjacent said end portions, said compartment having a radially outer portion and said abutments substantially filling at least said radially outer portion of said compartment at the end portions of said energy storing elements.

3. The apparatus of claim 1, wherein said substantially disc-shaped part extends substantially radially of said first flywheel and said one of said sections is of one piece with said disc-shaped part.

4. The apparatus of claim 1, further comprising a starter gear on said disc-shaped part of said first flywheel.

5. The apparatus of claim 1, wherein said energy storing elements have end portions and said damper device further comprises retainers for said end portions and means for preventing radially outward movement of said retainers against said portion of said at least one section under the action of centrifugal force.

6. The apparatus of claim 5, wherein said means for preventing forms part of said portions of said substantially disc-shaped member.

7. The apparatus of claim 5, wherein said retainers include portions extending into the end portions of said energy storing elements.

8. The apparatus of claim 7, wherein said portions of said retainers have a substantially conical shape.

9. The apparatus of claim 5, wherein said compartment has a radially outer portion and said retainers at least substantially fill the radially outer portion of said compartment at the end portions of said energy storing elements.

10. The apparatus of claim 5, further comprising a starter gear on said substantially disc-shaped part of said first flywheel.

11. The apparatus of claim 5, wherein said substantially disc-shaped part extends substantially radially of said first flywheel and said one of said sections is of one piece with said substantially disc-shaped part.

12. The apparatus of claim 1, wherein said flywheels are rotatable relative to each other in said directions from a neutral position through angles of at least 25 degrees against the resistance of said energy storing elements.

13. The apparatus of claim 12, wherein said energy storing elements have a stiffness of between 2–20Nm/° through an angle of at least 15° in each of said directions from said neutral position.

14. The apparatus of claim 12, wherein said substantially disc-shaped part extends substantially radially of said first flywheel and said one of said sections is of one piece with said substantially disc-shaped part.

15. The apparatus of claim 1, wherein said energy storing elements extend along between 70 and 96 percent of said annular compartment.

16. Apparatus for damping vibrations between an engine and a clutch in a power train, comprising a first flywheel connectable with an output element of the engine; a second flywheel having a friction surface engageable with a clutch plate of the clutch, one of said flywheels comprising sections defining a chamber including a radially outer portion which constitutes an annular compartment for a supply of viscous medium which at least partially fills said compartment, said flywheels being rotatable relative to each other in clockwise and counterclockwise directions; and a damper device movably coupling said flywheels to each other and including energy storing elements disposed in said compartment and arranged to store energy in response to rotation of said flywheels relative to each other in either of said directions, at least one of said sections including a portion disposed radially outwardly of said energy storing elements and extending substantially axially of said one flywheel, said energy storing elements bearing against said portion of said at least one section under the action of centrifugal force in response to rotation of said one flywheel, said damper device further including a substantially disc-shaped member arranged to transmit torque between said flywheels and having portions extending into said compartment and engaging said energy storing elements.

17. The apparatus of claim 16, wherein said one flywheel further comprises a substantially disc-shaped part which carries said sections and includes a radially inner portion connectable with the output element of the engine, one of said sections being of one piece with said part and further comprising a starter gear on said part.

18. The apparatus of claim 16, wherein said energy storing elements have end portions and said damper device further comprises retainers for said end portions and means for preventing radially outward movement of said retainers against said portion of said at least one section under the action of centrifugal force.

19. The apparatus of claim 18, wherein said retainers include portions extending into the end portions of said energy storing elements.

20. The apparatus of claim 19, wherein said portions of said retainers have a substantially conical shape.

21. The apparatus of claim 18, wherein said compartment has a radially outer portion and said retainers at least substantially fill the radially outer portion of said compartment at the end portions of said energy storing elements.

22. The apparatus of claim 18, wherein said means for preventing forms part of said portions of said substantially disc-shaped member.

23. The apparatus of claim 16, wherein said flywheels are rotatable relative to each other in said directions from a neutral position through angles of at least 25 degrees against the resistance of said energy storing elements.

24. The apparatus of claim 23, wherein said energy storing elements have a stiffness of between 2–20Nm/° through an angle of at least 15° in each of said directions from said neutral position.

25. The apparatus of claim 16, wherein said energy storing elements extend along between 70 and 96 percent of said annular compartment.

26. The apparatus of claim 16, wherein said portions of said substantially disc-shaped member include substantially radial arms.

27. The apparatus of claim 16, said sections include two grooved sections.

28. The apparatus of claim 27, wherein at least one of said grooved sections consists of sheet metal.

29. The apparatus of claim 27, wherein each of said grooved sections consists of sheet metal.

30. The apparatus of claim 16, wherein said compartment extends along an arc of 360° and further comprising abutments for stopping movement of said energy storing elements, said abutments being provided in said compartment.

31. The apparatus of claim 16, further comprising pocket-like abutments for stopping movement of said energy storing elements, said abutments being disposed between said energy storing elements in the circumferential direction of said annular compartment.

32. The apparatus of claim 16, wherein said energy storing elements have end portions and said damper device further comprises at least one piston interposed between a portion of said disc-shaped member and the respective energy storing element to displace the viscous medium in said compartment in response to angular movement of said disc-shaped member and one of said flywheels relative to each other.

33. The apparatus of claim 16, further comprising a coupling including a first portion carried by one of said flywheels and a second portion carried by the other of said flywheels, said first and second portions being in torque transmitting engagement with each other in predetermined axial positions of said flywheels relative to each other.

34. The apparatus of claim 33, wherein the energy storing elements are disposed in said chamber and said sections form part of said first flywheel, said substantially disc-shaped member constituting the output element of said damper device and one of said first and second portions, and further comprising means for sealing said chamber in response to axial movement of said flywheels relative to each other to positions of engagement of said first and second portions, said sealing means including a sealing member on one of said flywheels and a sealing surface provided on the other of said flywheels and engageable by said sealing member when said first and second portions of said coupling are in torque transmitting engagement with each other.

35. The apparatus of claim 16, wherein said substantially disc-shaped member is axially movably installed between said sections and constitutes the output element of said damper device, said sections forming part of said first flywheel.

36. The apparatus of claim 16, further comprising at least one friction generating device between said flywheels.

37. Apparatus for damping vibrations between an engine and a clutch in a power train, comprising a first flywheel connectable with the engine; a second flywheel rotatable relative to the first flywheel and having a friction surface engageable with a clutch plate of the clutch; and a damper device including an input component constituted by said first flywheel, an output component constituted by said second flywheel, an annular chamber including a radially outer portion constituting an annular compartment, a supply of viscous medium which at least partially fills said compartment, a plurality of energy storing elements which are disposed and supported in said compartment, said chamber having internal surfaces bounding said compartment and including radially outer portions, at least said radially outer portions of said internal surfaces conforming to the energy storing elements in said compartment to oppose radially outward movements of the energy storing elements under the action of centrifugal force when said flywheels rotate and to thus produce a frictional damping action between said energy storing elements and said radially outer portions of said internal surfaces, said flywheels being rotatable relative to each other against the resistance of said energy storing elements through at least 25 degrees in clockwise and counterclockwise directions starting from a neutral position, said energy storing elements including at least one elongated helical coil spring which is at least substantially unstressed in the neutral position of said flywheels and said energy storing elements jointly extending along an arc which approximates between 70 and 96 percent of a complete circle, and a flange rotatable with said second flywheel and extending into said compartment and engaging said elements.

38. Apparatus for damping vibrations, comprising at least two flywheels including first and second flywheels which are rotatable with, and through a predetermined angle relative to, each other about a predetermined axis, said first flywheel being connectable with a prime mover and said second flywheel being connectable with a transmission, one of said first and second flywheels comprising at least two components having sections extending substantially radially of said axis and bounding a chamber which is disposed between said sections, as seen in the direction of said axis, and has a closed radially outer portion; energy storing elements disposed in said chamber and arranged to undergo compression in a circumferential direction of said flywheels and to thus oppose at least a portion of rotation of said first and second flywheels relative to each other through said angle, at least one of said components having at least one abutment disposed radially outwardly of and at least partially overlying said elements in the direction of said axis to at least partially limit radially outward movements of said elements in said chamber under the action of centrifugal force when said flywheels are rotated; and coupling means extending substantially radially of said axis and including radially outer portions located in said chamber between said elements as seen in said circumferential direction, said coupling means further having a radially inner portion located outside of said chamber and connected with said second flywheel.

39. The apparatus of claim 38, wherein said at least one abutment is of one piece with said at least one component.

40. The apparatus of claim 38, further comprising at least one welded bond between said sections radially outwardly of said chamber.

41. The apparatus of claim 38, further comprising a starter gear provided on said one flywheel.

42. The apparatus of claim 38, wherein one of said components includes a portion extending substantially radially of said axis and disposed between said second flywheel and said coupling means, and further comprising means for sealing said chamber between said portion of said one component and said coupling means radially inwardly of said elements.

43. The apparatus of claim 42, wherein said sealing means comprises an annular diaphragm spring which is resiliently deformable in the direction of said axis.

44. The apparatus of claim 42, wherein said sealing means comprises an annular membrane which is resiliently deformable in the direction of said axis.

45. The apparatus of claim 38, further comprising a friction generating device arranged to generate friction in response to a portion of rotation of said first and second flywheels relative to each other through said predetermined angle.

46. The apparatus of claim 38, further comprising at least one spring disposed radially inwardly of and arranged to operate in parallel with said energy storing elements during a portion at least of rotation of said first and second flywheels relative to each other.

47. Apparatus for damping torsional vibrations, comprising at least two flywheels rotatable with and relative to each other about a predetermined axis and including a first flywheel connectable with a prime mover and a second flywheel connectable with a transmission, said first flywheel including at least two sheet-metal components having sections extending substantially radially of said axis and flanking an annular chamber; resilient elements disposed in said chamber and arranged to undergo compression in a circumferential direction of said flywheels, at least one of said components including at least one abutment disposed radially outwardly of and at least partially overlying said elements to take up at least a portion of centrifugal force acting upon said elements when said flywheels rotate, at least one of said components being of one piece with shoulders extending substantially in the direction of-said axis and alternating with said elements, as seen in said circumferential direction; and a torque transmitting member having an annular portion located radially inwardly of said elements and connected for rotation with said second flywheel, said member further having arms extending substantially radially outwardly between said sections and into said chamber, alternating with said elements in said circumferential direction, and cooperating with said shoulders to cause said elements to store energy during a portion at least of rotation of said flywheels relative to each other.

48. The apparatus of claim 47, further comprising a starter gear provided on one of said components.

49. The apparatus of claim 47, wherein one of said components confronts the prime mover and includes a radially inner portion connectable to a rotary output member of the prime mover, and further comprising an additional component secured to said radially inner portion, and a bearing mounted on said additional component to support said flywheels for rotation with and relative to each other.

50. The apparatus of claim 49, wherein said additional component and said radially inner portion of said one component include radially overlying regions provided with openings extending in at least substantial parallelism with said axis and arranged to receive threaded fastener means for attaching said first flywheel to the output member of the prime mover.

51. The apparatus of claim 50, wherein said fasteners are arranged to urge said radially inner portion of said one component and said additional component against each other in the direction of said axis upon completed attachment of said first flywheel to the output member of the prime mover.

52. Apparatus for damping vibrations between an engine and a clutch in a power train, comprising a first flywheel connectable with an output element of the engine; a second flywheel having a friction surface engageable with a clutch plate of the clutch, said first flywheel comprising sections defining a chamber including a radially outer portion which constitutes an annular compartment for a supply of a viscous fluid which at least partially fills said compartment, said flywheels being rotatable relative to each other in clockwise and counterclockwise directions; and a damper device movably connecting said flywheels to each other and including energy storing elements disposed in said compartment and compressible in a circumferential direction of said flywheels to store energy in response to rotation of said flywheels relative to each other, at least one of said sections of said first flywheel including a portion disposed radially outwardly of said energy storing elements and extending substantially axially of said first flywheel, said energy storing elements abutting said portion of said at least one section at least while said energy storing elements are being acted upon by centrifugal force in response to rotation of said first flywheel, one of said sections of said first flywheel further comprising a substantially disc-shaped part having a radially inner portion connectable with the output element of the engine and said damper device further comprising a substantially disc-shaped member arranged to transmit torque between said flywheels and having portions extending into said compartment and engaging said energy storing elements.

53. Apparatus for damping vibrations between an engine and a clutch in a power train, comprising a first flywheel connectable with an output element of the engine; a second flywheel having a friction surface engageable with a clutch plate of the clutch, one of said flywheels comprising sections defining an annular compartment having a radially outer region including a closed radially outer portion, said flywheels being rotatable relative to each other in clockwise and counterclockwise directions; and a damper device movably coupling said flywheels to each other and including compression springs disposed in said region of said compartment and arranged to store energy in response to rotation of said flywheels relative to each other, at least one of said sections including a portion disposed radially outwardly of said springs and extending substantially axially of said one flywheel, said springs abutting said portion of said at least one section at least when acted upon by centrifugal force in response to rotation of said one flywheel, said damper device further including a substantially disc-shaped member arranged to transmit torque between said flywheels and having portions extending into said compartment and engaging said springs.

54. Apparatus for damping vibrations between an engine and a clutch in a power train, comprising a first flywheel connectable with an output element of the engine; a second flywheel having a friction surface engageable with a clutch plate of the clutch, one of said flywheels comprising sections defining an annular compartment having a closed radially outer portion and said flywheels being rotatable relative to each other through a predetermined angle in clockwise and counterclockwise directions; a damper device movably coupling said flywheels to each other and including compression springs disposed in said radially outer portion of said compartment and arranged to store energy in response to rotation of said flywheels relative to each other, at least one of said sections including a portion disposed radially outwardly of said springs and extending substantially axially of said one flywheel, said springs abutting said portion of said at least one section at least when acted upon by centrifugal force in response to rotation of said flywheels, said damper device further including a substantially disc-shaped member arranged to transmit torque between said flywheels and having portions extending into said compartment and engaging said energy storing elements, said substantially disc-shaped member having a portion disposed radially inwardly of said springs and non-rotatably connected to said second flywheel; and means for generating friction between said flywheels only during a portion of rotation of said flywheels relative to each other through said predetermined angle.

55. Apparatus for damping vibrations between an engine and a clutch in a power train, comprising a first flywheel connectable with an output element of the engine; a second flywheel having a friction surface engageable with a clutch plate of the clutch, one of said flywheels comprising sections defining an annular compartment having a radially outer region including a closed radially outer portion, said flywheels being rotatable relative to each other in clockwise and counterclockwise directions; and a damper device movably coupling said flywheels to each other and including a first set of compression springs disposed in said radially outer region of said compartment and arranged to store energy in response to rotation of said flywheels relative to each other, at least one of said sections including a portion disposed radially outwardly of said springs and extending substantially axially of said one flywheel, said springs abutting said portion of said at least one section at least under the action of centrifugal force in response to rotation of said one flywheel, said damper device further including a substantially disc-shaped member arranged to transmit torque between said flywheels and having portions extending into said compartment and engaging said springs, and said damper device still further including a second set of compression springs disposed radially inwardly of and arranged to operate in parallel with the springs of said first set.

* * * * *

UNITED STATES PATENT AND TRADEMARK OFFICE
CERTIFICATE OF CORRECTION

PATENT NO.    : 6,558,260 B1                                      Page 1 of 1
DATED         : May 6, 2003
INVENTOR(S)   : Johann Jackel et al.

It is certified that error appears in the above-identified patent and that said Letters Patent is hereby corrected as shown below:

Title page,
Item [73], Assignee, "uK Lamellen und Kupplungsbau Beteiligungs KG" should be
-- LuK Lamellen und Kupplungsbau Beteiligungs KG --

Signed and Sealed this

Thirtieth Day of December, 2003

JAMES E. ROGAN
*Director of the United States Patent and Trademark Office*